US006531246B2

(12) United States Patent
Hanafusa et al.

(10) Patent No.: US 6,531,246 B2
(45) Date of Patent: Mar. 11, 2003

(54) PLATE-SHAPED BATTERY AND BATTERY APPARATUS

(75) Inventors: Kiyoshi Hanafusa, Tokyo (JP); Hiroichi Ishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 41 days.

(21) Appl. No.: 09/734,642

(22) Filed: Dec. 13, 2000

(65) Prior Publication Data

US 2001/0051298 A1 Dec. 13, 2001

Related U.S. Application Data

(63) Continuation of application No. PCT/JP99/02533, filed on May 14, 1999.

(51) Int. Cl.[7] .............................. H01M 2/02; H01M 2/08
(52) U.S. Cl. ...................... 429/162; 429/176; 429/181; 429/7
(58) Field of Search .......................... 429/7, 162, 176, 429/180, 181

(56) References Cited

U.S. PATENT DOCUMENTS

| 2,870,235 | A | * | 1/1959 | Soltis | 429/162 X |
| 5,134,046 | A | * | 7/1992 | Chow et al. | 429/176 |
| 5,948,562 | A | * | 9/1999 | Fulcher et al. | 429/162 X |
| 6,117,585 | A | * | 9/2000 | Anani et al. | 429/7 X |
| 6,120,935 | A | * | 9/2000 | Van Lerberghe | 429/162 X |
| 6,242,130 | B1 | * | 6/2001 | Noh et al. | 429/176 X |

FOREIGN PATENT DOCUMENTS

| JP | 60-211763 | 10/1985 |
| JP | 61-221861 | 10/1986 |
| JP | 62-131469 | 6/1987 |
| JP | 3-55653 | 5/1991 |
| JP | 10-13512 | 1/1998 |
| JP | 10-302756 | 11/1998 |

* cited by examiner

*Primary Examiner*—Stephen Kalafut
(74) *Attorney, Agent, or Firm*—Rothwell, Figg, Ernst & Manbeck

(57) ABSTRACT

A plate-shaped battery comprises: a battery core which has a laminated structure of a sheet-shaped positive electrode and a sheet-shaped negative electrode laminated through a separator, and which has a positive and a negative terminal which are connected electrically to both the electrodes, respectively; and a laminated film which laminates a polymer resin and a metallic foil and which seals both the terminals, and covers the battery core, wherein the metallic foil is connected electrically with a positive or negative pole of the electrodes.

20 Claims, 16 Drawing Sheets

PLATE-SHAPED BATTERY AND BATTERY APPARATUS

CROSS-REFERENCE TO THE RELATED APPLICATION

This application is a continuation of International Application No. PCT/JP99/02533, whose International filing date is May 14, 1999, the disclosures of which Application are incorporated by reference herein. The present application has not been published in English.

BACKGROUND OF THE INVENTION

1. Field of the Invention

The present invention relates to a plate-shaped battery and an electronic apparatus. In particular, the invention relates to a method of sealing an electrode lead line of a battery and applying a covering laminate film to a plate-shaped battery.

2. Background to the Invention

FIG. 1 is a perspective view of the outer appearance of a conventional thin plate-shaped battery which is charged with and discharges battery energy. Typical examples include for instance a nickel-cadmium battery, a nickel-hydrogen battery, a lithium ion battery or the like. FIG. 2 is a cross sectional view along the line A–A' of the plate-shaped battery in FIG. 1. FIG. 3 is a cross sectional schematic view of a battery core.

In the figures, reference numeral 81 denotes a thin plate-shaped battery which is a battery formed in a thin shape such as a nickel-cadmium battery, a nickel-hydrogen battery, a lithium ion battery or the like; reference numerals 2, 3 respectively denote positive and negative electrode lead lines which are the input and output terminals of the plate-shaped battery 1; 2a, 3a denote positive and negative electrode terminals of an internal battery, respectively; 2aa, 3bb denote the sheet-shaped positive and negative electrodes of the internal battery, respectively; and 82 denotes a separator interposed between the sheet-shaped positive electrode 2aa and negative electrode 3bb.

Reference numerals 5, 9 each denote a metallic foil comprised by a metallic material such as aluminum which covers the internal battery; 4, 6, 8, 10 each denote a polymer resin such as polyethylene, polypropylene, polyethylene terephthalate, which is adapted to increase the weak mechanical strength of the metallic foil and which covers the metallic foil in order to prevent direct damage to the metallic foil 5 from the exterior. 11 comprises an external sheet which is a single sheet which is applied to the resins 4, 6 on the top and bottom of the metallic foil 5 and which covers the battery interior of the plate-shaped battery 1; 12 is an external sheet which comprises a single sheet which is applied to the resins 8, 10 on the top and bottom of the metallic foil 9 and which covers the battery interior of the plate-shaped battery 1 in the same way. Depending on a method of manufacture, the external sheets 11, 12 can be formed in a single folded sheet; 7 denotes an adhesive material comprised of an insulating material such as resin which sandwiches the positive and negative electrode lead lines 2, 3, with the external sheet 11 and the external sheet 12 and which fixes the positive and negative electrode lead lines by sealing the terminal with heat fusion or welding.

As shown in FIG. 3, the sheet-shaped positive and negative electrodes 2aa, 3bb in the battery interior 81a of the plate-shaped battery are electrically connected respectively with the positive and negative terminals 2a, 3a. The sheet-shaped positive and negative electrodes 2aa, 3bb in the battery interior of the plate-shaped battery 81 are electrically connected respectively with the positive and negative terminals 2a, 3a and form the input and output terminals of the battery. As shown in FIG. 2, the peripheries of the battery lead lines 2, 3 (see FIG. 3) are covered by external sheets 11, 12 and sealed by heat fusion or welding using a separate resin from that forming the exterior sheet. The battery lead lines 2, 3 are comprised of a thin straight plate.

As shown in FIG. 3, the battery interior 81a is a laminate structure formed of the sheet-shaped positive and negative electrodes 2aa, 3bb with a separator 82 there between. The laminated structure is filled with an electrolytic solution and the battery interior is completely sealed with a covering film.

The operation of the conventional battery 81 is described below.

The positive and negative electrodes lead lines 2, 3 of the plate-shaped battery 1 mounted in an electronic apparatus are connected to an electronic apparatus which mounts electrical circuits comprised from various types of electrical components on a printed board. Thus a potential difference is generated with the electrical components and a current flows through both the electrode lead lines 2, 3.

In such a way, the conventional plate-shaped battery 81 which uses polymer resins 4, 6, 8, 10 such as polyethylene, polypropylene, polyethylene terephthalate or the like, is covered in external sheets 11, 12 comprised of aluminum foil, for example. The foil comprises three layers interposing metallic foils 5, 9 comprised of aluminum which has few pinholes and high flexibility. However, although the terminals of the electrode lead lines 2, 3 are sealed with the external sheets 11, 12, the peripheries of the electrode lead lines 2, 3 are sealed by welding using an adhesive material separate from the polymer resins 4, 6, 8, 10 which comprise the laminate film.

Since the conventional plate-shaped battery 81 is structured as discussed above, the metallic foils 5, 9 which are formed from a large surface area aluminum sheet in the aluminum laminated film which covers the plate-shaped battery 81 are not connected with the electrode of the plate-shaped battery 81 and thus have a floating electric potential. Since the electric potential fluctuates, the problem has arisen that the electrical circuit, which supplies the electrical energy of the battery, and the interior battery 81a, which forms the battery core stored in the laminate film, are not used as an electrical shield (magnetic shield, electrostatic shield).

The further problem has arisen that in spite of the fact that the polymers 4, 6, 8, 10 such as polyethylene, polypropylene, or polyethylene terephthalate has a dielectric constant, the external sheets 11, 12 comprised by an aluminum laminated film or the like which contains the polymers 4, 6, 8, 10 are not used as a single electric component such as a condenser or an antenna.

The conventional plate-shaped battery 81 has a sealed structure complicated by the fact that a separate sealing resin 7 to the laminated film must be provided. Since an adhesive material 7 solely employed as a sealing resin for the sealed section is used, sealing is difficult.

Since the electrode lead lines 2, 3 each comprise a thin straight plate, the adhesion of the electrode lead lines 2, 3 and the external sheets 11, 12 comprising the laminated film is weak and the problem has arisen that forward and backwards motion in the direction of electrode lead line detachment is facilitated.

SUMMARY OF THE INVENTION

The present invention is proposed to solve the above problems and has the object of providing a plate-shaped battery using a metallic foil such as aluminum in the laminated film as an electrical shield and antenna. A laminated film containing resin having a dielectric constant is used as an electrical component such as a condenser.

A further object of the present invention is to increase the mechanical strength of the external terminal and to electrically connect the external terminal at the same time as well as fixing the plate-shaped battery to an electronic apparatus in order to determine the capacity of the condenser.

The present invention has a simplified structure and a plate-shaped battery is proposed with improved adhesion in which the lead lines do not move forwards and backwards in a detaching direction.

The plate-shaped battery of the present invention is provided with a laminated film of laminated polymer resin and metallic foil which seals the positive and negative electrode terminals as well as covering the electrical core. The metallic foil is electrically connected with the positive and negative poles of the battery core.

The laminated film has conventionally not been used as an electrical component. However, with such a structure, it is possible to use the film as an electrical component having the same potential as the reference potential of the battery.

The plate-shaped battery of the present invention disposes a first aperture and a second aperture which respectively expose both terminals in a terminal section in which the positive and negative terminals are sealed by a laminated film. Either one of the first and second apertures is electrically connected with a metallic foil.

In such a way, an electrical circuit in an electronic apparatus such as a radio which stores a plate-shaped battery can be operated in a stable manner and the potential of the metallic foil in the laminated film is set to the same reference potential as that of the battery.

The plate-shaped battery of the present invention allows the extensions of the positive and the negative electrodes or other electrodes in order to provide a fixed potential in the metallic foil in the laminated film.

In this way, since the metal in the laminated film is extended outside the battery housing from a part of the laminated film and not from the battery core, the potential can be easily fixed.

The plate-shaped battery of the present invention provides a hole in a section of the battery housing. An electrode can be led through the open hole.

In such a way, it is possible to improve the mechanical strength of the laminate seal proximate to the terminal section.

According to the plate-shaped battery of the present invention, in the metallic foil inside the laminated film, either the positive terminal or the negative terminal and the positive or the negative pole outside the battery housing are positioned with respect to the lead line of the metallic foil in the same section or in different sections when observed from the top.

In such a way, since the metallic foil in the laminated film is connected with the terminal outside the housing, it is possible to perform a connection by adhesion, press fitting or welding in a stable manner and to thus improve adhesive strength.

The plate-shaped battery of the present invention comprises an electrical shield, magnetic shield or electrostatic shield which shields an electrical circuit, which supplies the electrical energy of the battery, and the battery core incorporated in the laminated film. The shield is comprised of electrically connecting the metallic foil in the laminated film to the negative and positive poles.

In such a way, since the metallic foil in the laminated film has the same equipotential as the electrode, the battery core and interior of the laminated film, and the electrical circuit which supplies the electrical energy of the battery may be electrically shielded (magnetically shielded. electrostatically shielded).

The plate-shaped battery of the present invention leads a metallic terminal, which is electrically connected with the metallic foil in the laminated film, from a section of the battery housing which is separate to the positive and negative electrodes.

In such a way, it is possible to use the metallic foil in the laminated film as a single electrical component which comprises a section of an electrical circuit having a separate reference potential to the battery.

The plate-shaped battery of the present invention disposes an island created by a metallic foil comprising a laminated film in proximity to the terminal sealing the positive and the negative terminals.

In such a way, wiring resistance can be minimized and it is possible to make use of a conventionally wasteful space at the sealing section of the electrode terminal of the battery.

The plate-shaped battery of the present invention forms an electrical circuit by mounting one or more than one electrical component on the island of the terminal section.

By such a way, an electrical circuit may be formed which mounts condensers, resistors, PTCs or the like by effectively using a conventionally wasteful space at the sealing section of the electrode terminal of the battery.

The plate-shaped battery of the present invention connects a section of the electrical circuit with the metallic foil in the laminated film, the positive or the negative pole.

In such a way, an electrical circuit such as a protection network for the battery can be formed by effectively using a conventionally wasteful space at the sealing section of the electrode terminal of the battery.

The plate-shaped battery of the present invention disposes a printed board mounting an electrical circuit between a negative or positive terminal and a metallic terminal which is connected electrically with the metal foil in the laminated film and fixes the board onto the terminal sealing laminate.

In such a way, the reliability of the printed board with respect to vibrations or the like may be improved by fixing the printed board with an adhesive or the like to the battery.

The electronic apparatus of the present invention is provided with a plate-shaped battery laminating a polymer resin and a metallic foil and covering a battery core. The plate-shaped battery has a laminated film which seals the positive and negative terminals and which electrically connects the metallic foil with the positive or negative pole of the electrodes. The apparatus also comprises an electrical circuit which mounts one or more than one electrical component on an island created by the metallic foil formed in proximity to the terminal sealing the positive and negative electrode terminals. The plate-shaped battery and the electrical circuit are contained by the main housing and the back housing. By such an arrangement, the plate-shaped battery is fixed with a plate which is comprised by a material composed of at least one of glass, metal or resin. The plate fixes the plate-shaped battery by maintaining a fixed distance with the metallic foil and fixing a condenser capacity. This is achieved by disposition between the metallic foil and the housing mounting a battery core or a plate-shaped battery or a plate fixing the plate-shaped battery or a combination of the two.

In such a way, a fixed distance is maintained between a metallic foil in a laminated section and a plate which fixes a plate-shaped battery or between a board on which a battery core or a plate-shaped battery are fixed or a combination of the above. Thus the capacitance with the battery core is fixed and it is possible to use the capacitance as a section of the circuit.

An electronic apparatus of the present invention fixes the above structure by pressing the plate-shaped battery with a back of the main housing.

In such a way, it is possible to fix the condenser capacity as discussed above in a simple manner and to apply this to a section of the electrical circuit.

An electronic apparatus of the present invention comprises an antenna of a radio device created by a condenser capacity between the reference potential of the radio device supplied by the plate-shaped battery and the metallic foil in the laminated film, and a section or the entirely of the metallic foil.

In such a way, it is possible to use the metallic foil in the laminated film as an antenna and to form a matching circuit by using the condenser capacity between the metallic foil and the earth as a matching condenser in the matching circuit in the electrical circuit.

An electronic apparatus of the present invention fixes the plate-shaped battery to a fixed position in order to maintain a fixed distance between the metallic foil in the laminated film and the earthing or power source line on the printed board.

In such a way, it is possible to maintain the capacitance as discussed above at a normally fixed value in spite of the battery expanding or contracting in response to being charged or discharging electrical power.

An electronic apparatus of the present invention mounts a first connector on an extended tip section, a tip of an electrical wiring which is connected to the cell electrode or a section of the electrical wiring. The extended tip section extends a cell electrode comprising the positive and negative electrode terminals of the plate-shaped battery mounted on the back housing. A connecting device containing a second connector is mounted on an electrical signal line containing the power source circuit of the electrical circuit in the main housing. A circuit electrically connected with the first connector is adhered and connected to the back housing.

In such a way, it is possible to secure an electrical connection of an electrical circuit of an electronic apparatus main body such as a mobile telephone and a battery having a mechanically weak electrode.

The electronic apparatus of the present invention fixes a plate-shaped battery by sandwiching a battery housing, which is a section of the back housing, and the cell electrode of the plate-shaped battery with a fixing means such as a biasing spring or a fixing clip onto the printed board or the housing of another electronic apparatus.

In such a way, it is possible to fix and accurately determine the position of an electrode or a battery by application of a fixing means such as a fixing clip or a biasing spring. Furthermore, it is possible to suppress a contact resistance between the electrode and the wiring to an extremely low level.

The plate-shaped battery of the present invention forms a terminal sealing the positive and negative electrode terminals by thermal fusion of the aforementioned polymer resin on the side of a battery cell without the use of a different resin from the polymer resin. The resin acts as an adhesive with the laminated film when the battery core is covered with the laminated film which has a laminated structure sandwiching a metallic foil with the polymer resin.

In such a way, it is possible to seal the laminated film with a simple structure.

The plate-shaped battery of the present invention adapts the terminal sealed with a laminate film of the positive and negative electrode lead lines which are respectively electrically connected to the positive and negative terminals. The invention is characterized in that a hole is opened in the positive or negative electrode lead lines, a flat net structure or a roughened structure is formed on the surface of the positive or negative electrode lead lines, or the positive or negative electrode lead lines are formed in a branched or zigzag pattern.

In such a way, the adhesive qualities of the laminated film and the positive and negative electrode lead lines are improved and it is possible to reduce horizontal slip and improve strength with respect to detachment of the lead line.

The laminated film in the plate-shaped battery of the present invention comprises a laminated structure of a metallic foil formed from stainless steel and a polymer resin with the polymer resin being disposed on the side of the battery cell.

In such a way, since it is possible to extend a metallic foil made from the stainless steel thinly with few pinholes and with high mechanical strength, it is possible to prevent damage from the exterior from reaching the battery core in comparison with the use of a metallic foil made from aluminum. Furthermore such a film is resistant to corrosion and may be extended thinly, it is possible to reduce the weight of the battery.

DETAILED DESCRIPTION OF THE PREFERRED EMBODIMENTS

In order to describe the invention in greater detail, the preferred embodiments of the invention will be described below with reference to the accompanying figures.

Embodiment 1

Figure 4:
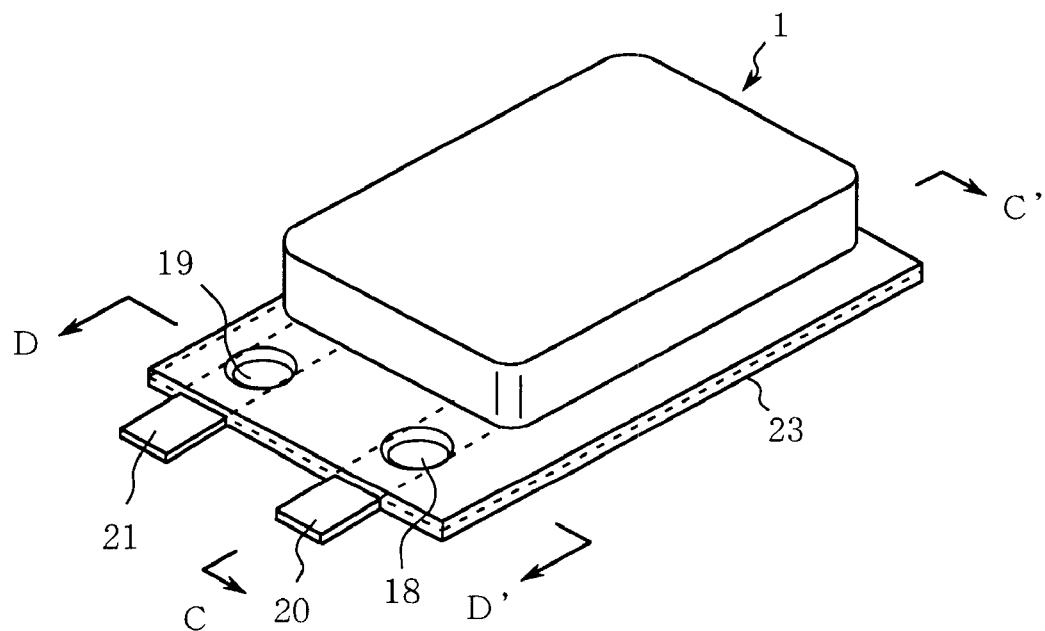
FIG. 4 is a perspective view of a plate-shaped battery according to an embodiment 1 of the present invention.
Figure 5:
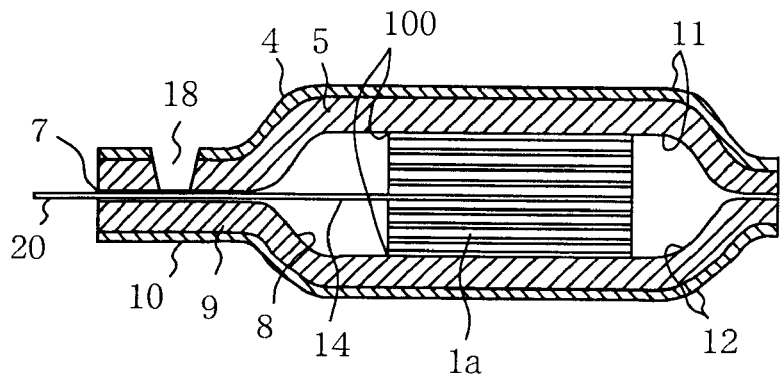
FIG. 5 is a cross sectional view along the line C–C' of FIG. 4.
Figure 6:
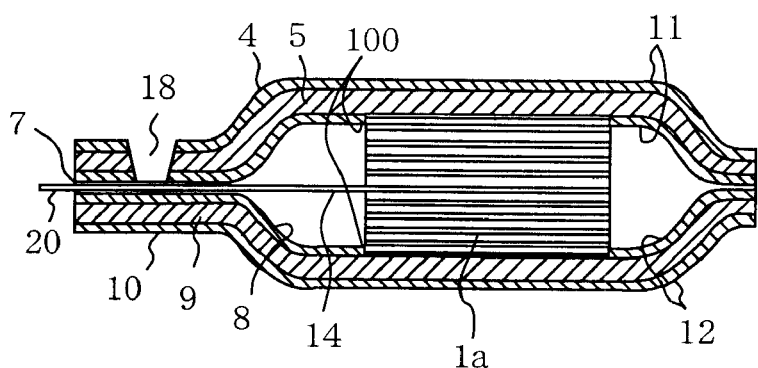
FIG. 6 is a cross section view of a variation on the structure as shown in FIG. 5.

FIG. 4 is a perspective figure showing a plate-shaped battery which discharges electricity and is charged with electricity and is represented by a nickel-cadmium battery, a nickel-hydrogen battery and a lithium ion battery according to a first embodiment of the present invention. FIG. 5 is a cross sectional view along the line C–C' of FIG. 4. FIG. 6 is a cross section view along the line D–D' as shown in FIG. 4.

In the figures, reference numeral 1 denotes a thin plate-shaped battery such as a nickel-cadmium battery, a nickel-hydrogen battery or a lithium ion battery; 1a is a battery core which is the interior of a battery of a plate-shaped battery 1; 21, 20 are positive and negative lead lines at the respective input and output terminals of a plate-shaped battery 1; 4, 10 each are a polymer resin such as polyethylene, polypropylene, or polyethylene terephthalate; 5, 9 each denote a metallic foil comprised of a metallic material such as aluminum or the like; 11 is a single external sheet formed in a laminated shape by adhesion of a metallic foil 5 and a resin 4; 7 is a resin for adhering the metallic foils 5, 9 and the electrode lead line 20; 12 is a single external sheet which is formed in the same laminated manner as above by the adhesion of the resin 10 and the metallic foil 9; 19, 18 are respective lead holes for the positive and negative electrodes; 19a is an insulating section created by an insulating body and air; and 100 is a connecting section of the metallic foils 5, 9 and the battery core 1a.

As a variation on the above, as shown in FIG. 6, the battery core 1a may be connected electrically with both or either of the metallic foil 5 in the laminated film of the upper and lower triple layer.

The external sheet 11, 12 will be hereafter referred to as a laminated film.

Figure 3:
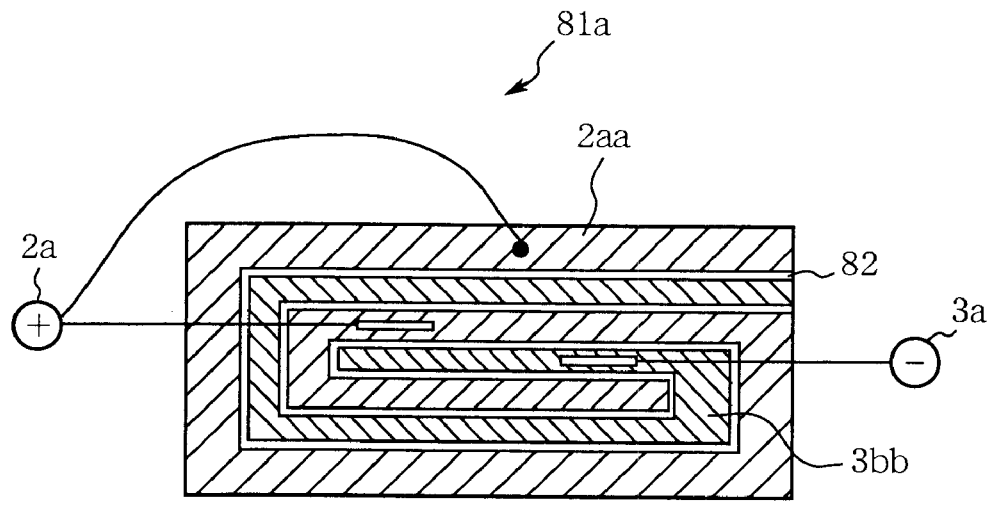
FIG. 3 is a cross sectional view of an internal battery along the line B–B' in FIG. 1.

Referring now to FIG. 5, a battery core 1a provided with electrode lead lines 21, 20 is sandwiched at the top and the bottom by an external sheet 11 and an external sheet 12. The battery core 1a is joined electrically by adhesion, press fitting or welding in the battery with the positive or negative pole plate on the outermost periphery of the battery core 1a through a connecting section 100 with the foil 5 and the foil 9. For example, to explain using the internal battery 81a as shown in FIG. 3, a sheet shaped positive electrode 2aa on the outermost periphery of the battery core 1a is electrically connected through the connecting section 100 to the metallic foil 5. Thus, the metallic foil on an inner section of the external sheet 11 is set to the positive equipotential of the battery.

Figure 7:
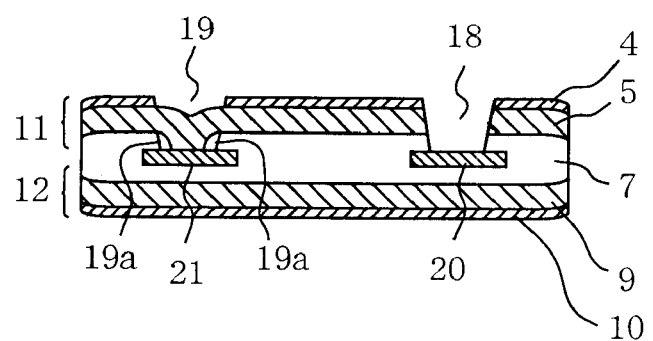
FIG. 7 is a cross sectional view along the line D–D' of FIG. 4.

The same connection with the connecting section 100 above is possible with the terminal section which seals the electrode lead lines 21, 20. That is to say, with reference to FIG. 7, the metallic foil 5 in the external sheet 11 can be understood as being electrically connected at the lead hole 19 of the electrode lead line 21.

The structure of the battery core 1a is the same as the internal battery 81a as described with reference to the prior art. A sheet shaped positive electrode 2aa and a negative electrode 3aa are laminated through a separator and filled with an electrolytic fluid and respectively connected electrically to the positive and negative electrode lead lines 21, 20 (refer to FIG. 3).

The separator is formed from a material such as resin or a like material which has the same function as resin.

The operation of the invention is described below.

When metallic foils 5, 9 are connected electrically through the connector 100 with respect to one of the positive and negative electrode lead lines 21, 20 which are the input and output terminals, the potential of both of the metallic foils 5, 9 takes the reference potential and equipotential of the battery through the lead lines 21, 20. As a result, the potential of the metallic foils 5, 9 on the inner section of the external sheets 11, 12 does not fluctuate.

As shown above, according to the embodiment 1, the metallic foils 5, 9 comprised from aluminum or the like in the external sheets 11, 12 which cover the plate-shaped battery 1 are connected to the electrode of the battery core 1a and thus have as a stable potential. Thus, it is possible to use the foil as an electrical component having the same equipotential and reference potential of the battery.

The above-mentioned variation on the first embodiment will be described below.

Figure 8:
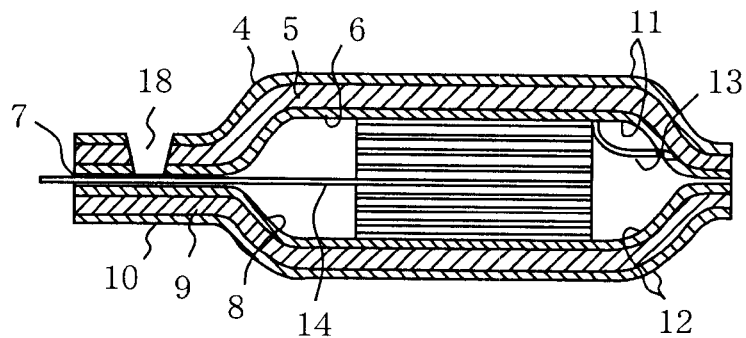
FIG. 8 is a cross sectional view along the line C–C' of FIG. 4 when the variation is applied to the embodiment 1 of the present invention.

FIG. 8 is a cross sectional view of a plate-shaped battery according to a variation on the first embodiment. In the figure, reference numerals 6, 8 each denote a polymer resin adhered respectively on the side of a battery core 1a of the metallic foils 5, 9; and 13 is a connector which breaks partially the inner resin 6, 8 covering the metallic foils 5, 9. The connector 13 connects the positive and negative electrodes which are electrically connected with both sides or on one side of metal portions of the metallic foils 5, 9. Components which are the same or similar are hereafter denoted by the same reference numerals and further description will be omitted.

In the first embodiment above, shown is a structure in which a polymer resin is not adhered to the battery core 1a of the metallic foils 5, 9. However, in the present variation, the polymer resins 6, 8 are adhered to the battery core 1a of the metallic foils 5, 9, which are electrically connected to the electrode of the battery core 1a through a connector 13 from the connecting section 100. This variation allows the stabilization of the potential of the metallic foils 5, 9 in the same way as above and thus enables use as an electronic component.

Embodiment 2

Figure 9:
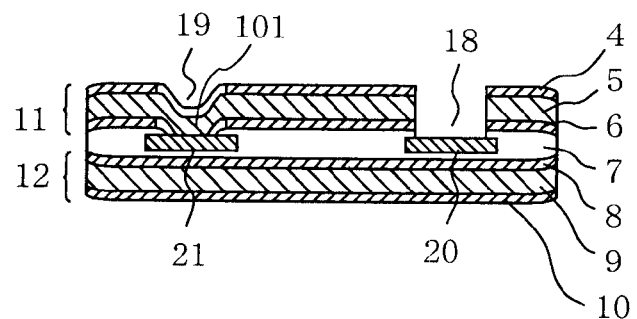
FIG. 9 is a cross sectional view of a plate-shaped battery according to an embodiment 2 of the present invention.

FIG. 9 is a cross sectional view of a plate-shaped battery according to a second embodiment of the present invention and corresponds to the laminated structure shown in the external sheets 11, 12 as shown in the variation. In the figure, 101 is a connector comprised by a conductor formed by a positive electrode lead line 21 and a metallic foil 5 in the laminated film in an lead hole 19. Needless to say, the negative electrode 20 can have an equivalent structure.

With reference to FIG. 9, a hole is opened in the external sheet 11, which constitutes a housing on a cell electrode, to form a lead hole 19 by exposing the surface of the lead line 21. A connector 101 is formed at this position and the metallic foil 5 in the external sheet 11 which comprises the laminated film and the lead line 21 are electrically connected by adhesive, welding or the like. In such a way, the input and output of the electrical energy of the battery is not taken from the mechanically weak cell electrode covered with the laminated film but from the lead hole 19 which forms a hole in the housing on a cell electrode such as a mechanically strong lead line 21.

The description of the operation is the same as the first embodiment above and will be omitted.

As shown above, according to the second embodiment, since the input/output force of the electrical energy of the battery is not taken from a cell electrode with weak mechanical strength but from the lead hole 19 formed in the terminal section of the mechanically strong laminate seal, it is possible to improve the mechanical strength of that section.

Embodiment 3

Figure 10:
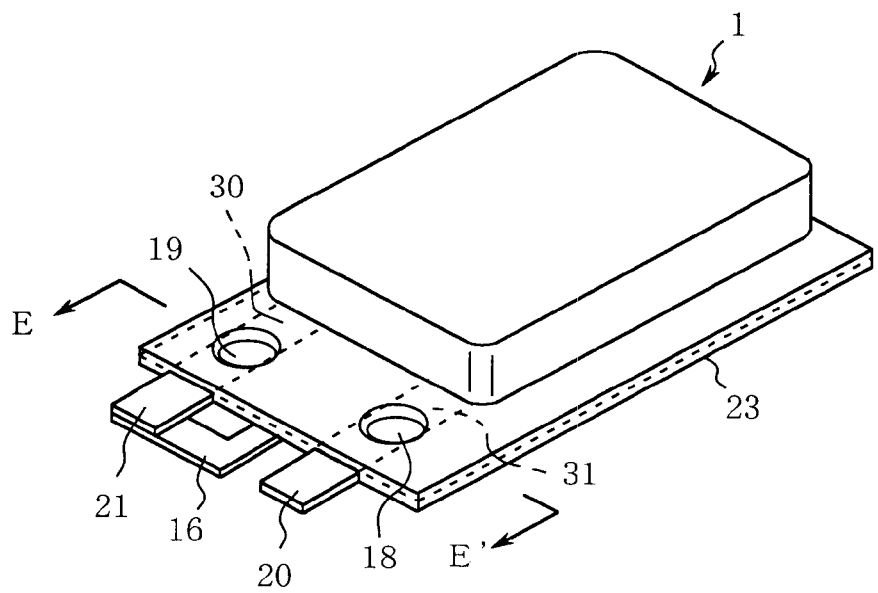
FIG. 10 is a perspective view of a plate-shaped battery according to an embodiment 3 of the present invention.
Figure 11:
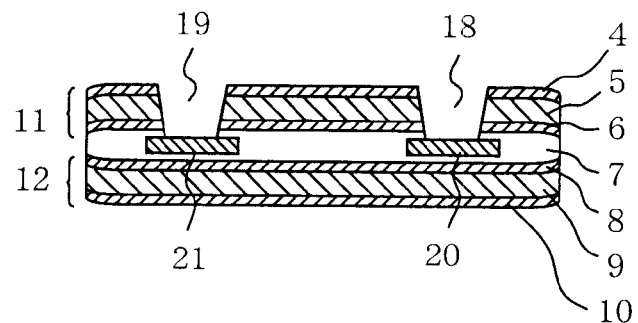
FIG. 11 is a cross sectional view along the line E–E' of FIG. 10.

FIG. 10 is a perspective view of a plate-shaped battery according to a third embodiment of the present invention. FIG. 11 is a cross section along the line E–E'. In the figure, 16 denotes a lead line made of aluminum or the like extending from metallic foils 5, 9 in external sheets 11, 12 which electrically connect a positive electrode line 21; and 23 is a metallic foil in the laminated film and extends to a lateral surface of a housing from the metallic foil 5, 9.

A plate-shaped battery 1 of the embodiment 3, as shown in FIG. 10, connects the metallic foils 5, 9 in the laminated film through the lead line 16 to the positive electrode lead line 21 drawn from a battery core 1a. In this case, the positive electrode lead line 21 which is in the shape of a letter "L" and is drawn out from the housing is electrically connected to the metallic foil 16 outside the housing, not inside the battery housing. When the connecting section is viewed from the top, the position of the aluminum metallic foil 16 in the laminated film appears to diverge from the positive electrode lead line 21.

By such a structure, it is not necessary to electrically connect the metallic foils 5, 9 in the lead holes 19, 18 and the electrode lead lines 21, 20 as discussed above. An example of connecting the metallic foil 16 to the positive electrode lead line 21 has been given, however it is also possible to connect the metallic foil 16 to the negative electrode lead line 20.

As described above, according to the embodiment 3, since the metallic foils 5, 9 in the laminate film are connected to the electrode lead lines 21, 20 through the lead line 16 outside the battery housing, it is possible to perform the connection in a stable manner by adhesion, press fitting or welding and to improve the strength of the connection.

Embodiment 4

As mentioned in the embodiments 1–3 above, possible is a structure in which a battery core 1a stored in a laminated film and an electrical circuit which supplies an electrical energy of a battery are electrically shielded (magnetically shielded, electrostatically shielded) by electrically connecting metallic foils 5, 9 in the laminated film containing the external sheet 11, 12 to the cell electrode in the battery core 1a. This is enabled by electrically shielding the electrical circuit which supplies the electrical energy of the battery and the battery core 1a by fixing the metallic potential in the laminated film in such a manner that the potential of the metallic foils 5, 9 is brought to the same potential as that of the battery in accordance with the aforementioned electrical connections.

As described above, according to the embodiment 4, the metallic foils 5, 9 in the laminated film each are equipotential to the cell electrode of the battery, thereby electrically shielding (magnetically shield, electrostatically shield) the electrical circuit which supplies the electrical energy of the battery and the battery core 1a stored in the laminated film.

Embodiment 5

Figure 12:
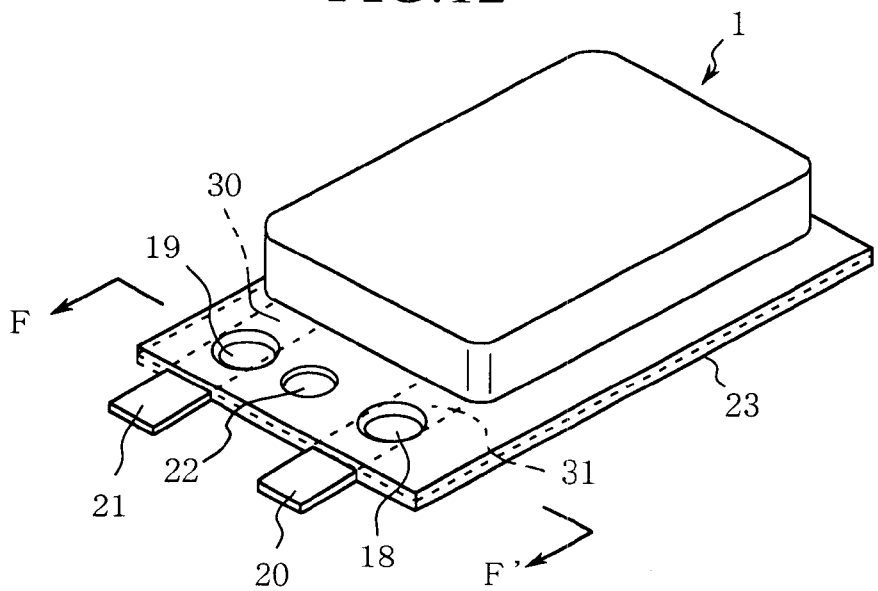
FIG. 12 is a perspective view of a plate-shaped battery according to an embodiment 5 of the present invention.
Figure 13:
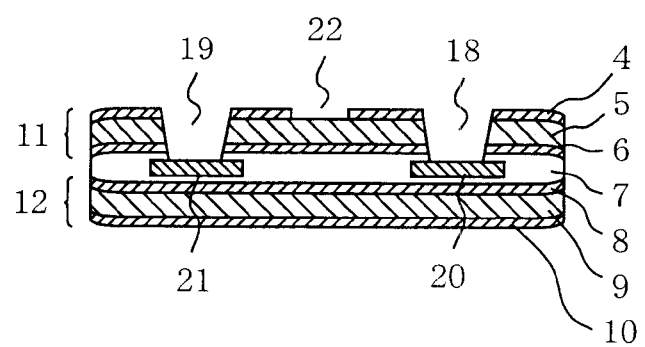
FIG. 13 is a cross sectional view along the line F–F' of FIG. 12.

FIG. 12 is a perspective figure of a plate-shaped battery according to an embodiment 5 of the present invention. FIG.

13 is a cross sectional view along the line F–F'. In the figure, 22 denotes a lead hole which is formed on a metallic foil 5 in a laminated film. That is to say, the metallic foils 5, 9 in the laminate film are led from a section of the battery housing, and is different from the cell electrode above. This may be positioned anywhere on the periphery of the battery which undergoes little expansion and compression in association with repeated charges/discharges of the battery. The lead hole 22 may be formed at the same time as the lead holes 19, 18.

According to the embodiment 5, the metallic foils 5, 9 in the laminated film may be used through the lead hole 22 as a single electronic component in the electrical circuit having another potential different from that of the battery. In FIG. 12, the lead hole 22 is represented as provided in the middle of the electrode lead holes 21, 20 in the laminate sealed terminal section.

As described above, according to the embodiment 5, the lead hole 22 is formed in the laminate sealed housing. The metallic foils 5, 9 in the laminated film are electrically connected through the hole 22. Thus, the metallic foils 5, 9, which had been conventionally not employed, may be electrically connected with the positive or negative electrodes. Furthermore, it is possible to use the metallic foils 5, 9 as an electronic component belonging to an electrical circuit having another potential different from the battery.

Embodiment 6

Figure 14:
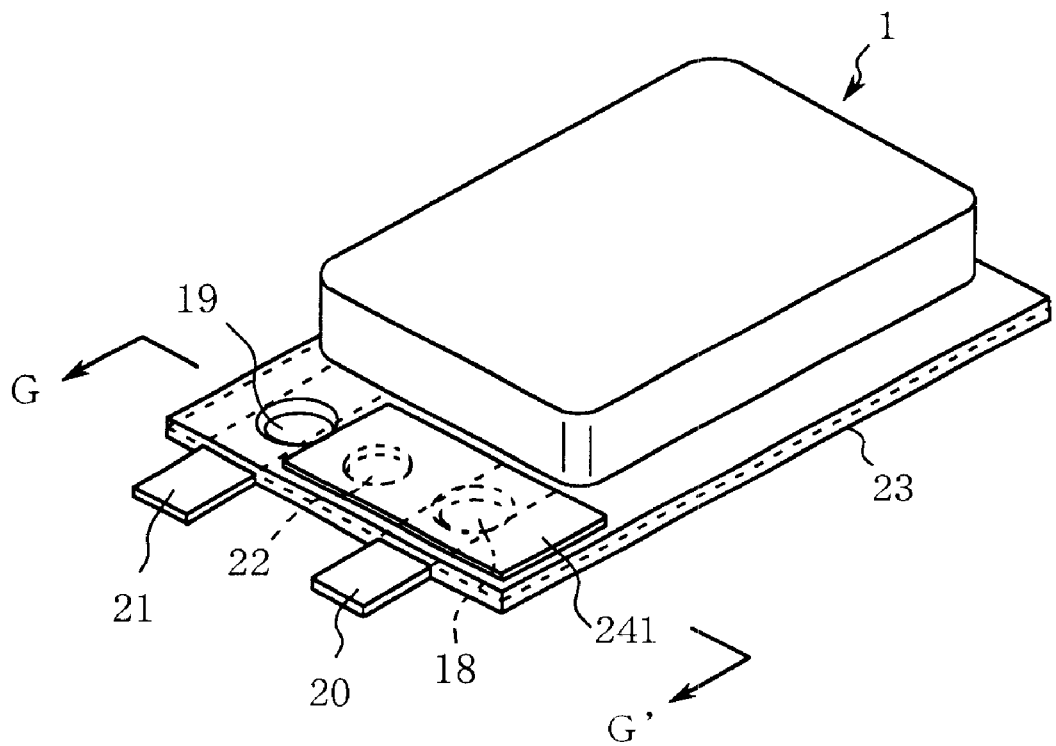
FIG. 14 is a perspective view of a plate-shaped battery according to an embodiment 6 of the present invention.
Figure 15:
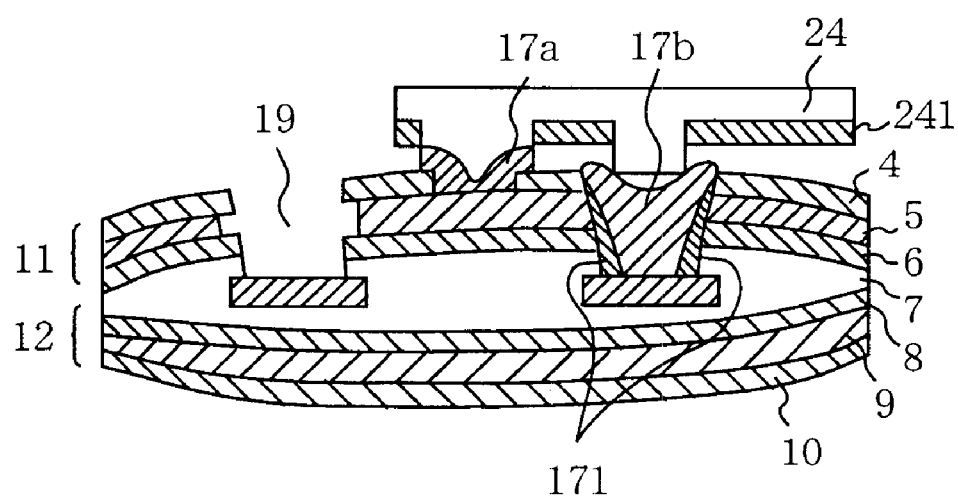
FIG. 15 is a cross sectional view along the line G–G' of FIG. 14.
Figure 16:
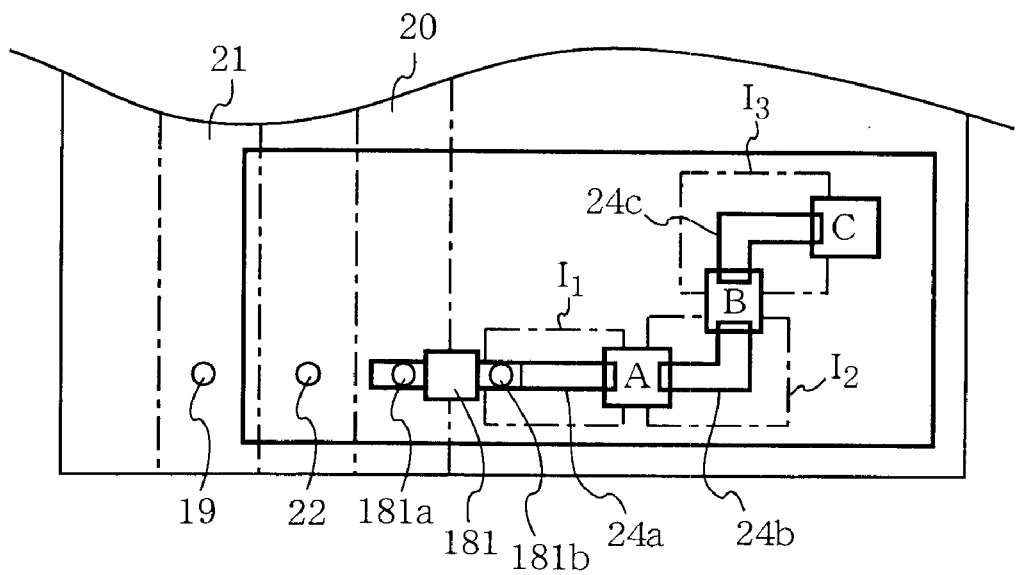
FIG. 16 is a top view showing an enlargement about a sealing section of a plate-shaped battery according to the embodiment 6 of the present invention.

FIG. 14 is a perspective view of a plate-shaped battery according to an embodiment 6 of the present invention. FIG. 15 is a cross sectional view along the line G–G'. FIG. 16 is an upper view showing an enlargement in the proximity of a sealing section of the plate-shaped battery. In the figures, 17a is an electrode formed in a lead hole 22; 17b is an electrode formed in a lead hole 18; 171 is an insulation section created by an insulating body and air; 241 is a printed board; 24 is a wiring on the printed board 241; A,B,C denote electrical components such as a PTC, a resistor, a condenser or the like; and 24a, 24b, and 24c are wirings.

In the plate-shaped battery according to the embodiment 6, as shown in FIG. 14, the above lead hole 22 is provided in a laminate sealed terminal section of the plate-shaped battery 1 in such a manner that an opening is formed in a polymer resin 4 on a metallic foil 5 comprising a laminated film. Wiring resistance is reduced to a minimum by disposing an island formed from a metal such as nickel, copper, aluminum or the like in proximity to the terminal of the plate-shaped battery. Furthermore, it is possible to use a wasteful space, which had been not used in the prior art, at the sealed section of the electrode terminal of the battery.

With reference to FIG. 16, an example is given of a PTC 181 being mounted in the terminal section by left and right spot welded sections 181a, 181b. At least one of electrical components A, B, C such as a resistor, condenser or the like are mounted through the copper wirings 24a, b, c and form an electrical circuit which is mutually connected therethrough. In this way, the wasteful space in the sealed section at the electrode terminal of the battery can be used, and it will be understood to form an electrical circuit mounting a PTC, a resistor, a condenser or the like.

When an electrical circuit is mounted with connecting a part of the aforementioned electrical circuit discussed above with the metallic foil 5 in the laminated film or the positive or negative electrode of the plate-shaped battery 1, it is possible to use the wasteful space in the sealing section at the electrode terminal of the battery to constitute a complicated electrical circuit.

FIG. 15 shows a specific example in cross section. If the metallic foil 5 such as aluminum in the laminate film and an electrode lead line 20 are disposed with the wiring 24 on the printed board 241 mounting an electrical circuit through the electrodes 17a, 17b, and the printed board 241 is fixed to the terminal section of the laminated seal by adhesive or the like, it is possible to constitute an electrical circuit disposing and fixing the printed board 241 in as aspect which maximizes the use of the wasteful space at the sealing section of the electrode terminal of the battery. The insulation section 171 in the lead hole 18 plays the important role of preventing short circuiting of the connecting electrode 17b and the metallic foil 5.

The metallic foil 5 forms an indentation retracted from the hole wall in order to prevent short circuiting in the same way in the lead hole 19.

In FIG. 14 to FIG. 16, a lead hole 22 is provided in the upper surface of the housing, and an island is formed by using the metallic foil 5. In the figures, one example of connecting electrically this island with the various electrical circuits is given. As another example, another lead hole is provided by opening the terminal section from the back of the housing. In the same way as above, an electrical circuit is constituted by an electrical connection with the metallic foil 9 in the laminated film.

As shown above, according to embodiment 6, the island formed by the metallic foils 5, 9 in the laminated film is provided as a lead hole 22 in proximity to the terminal section of the plate-shaped battery. Then, the wasteful space of the terminal section of the laminated seal which had been considered as a wasteful part in the prior art is used as an island. The electrical components A, B, C such as a condenser, a resistor, a PTC or the like are mounted on the island through the wirings 24a, b, c and constitute an electrical circuit. By connecting a part of the circuit with the metallic foils 5, 9 or the electrode lead lines 21, 20 of the plate-shaped battery, another electrical circuit is formed. Alternatively, the printed board 241 is disposed and fixed on the island and an electrical circuit is formed by the mutual connection of the metallic foils 5, 9 and the electrode lead lines 21, 20 through the printed board 241. In such a way, it is possible to effectively use the layout space in addition to the advantages of shortening a general wiring distance and reducing a wiring resistance.

Embodiment 7

Figure 17:
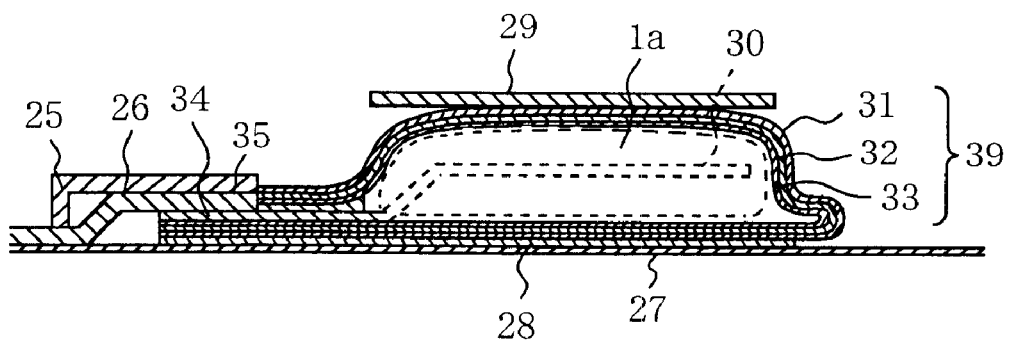
FIG. 17 is a longitudinal cross section showing a partial exploded view of a loaded structure of a plate-shaped battery according to an embodiment 7 of the present invention.

FIG. 17 is a longitudinal cross section showing a partial exploded view of a loaded structure of a plate-shaped battery according to an embodiment 7 of the present invention. In the figure, reference numeral 27 is a printed board; 30 is a positive or negative electrode which is a cell electrode of a battery core 1a; 25 is a terminal for a metallic foil in a laminated film from a device main body circuit on the printed board 27; 26 is a terminal for connecting an electrode 30 from the device main body circuit on the printed board 27; 28 is an adhesive tape such as a double-sided tape, or magic tape or the like; 29 is a plate such as resin, glass or resin which fixes the plate-shaped battery 1; 32 is a metallic foil such as aluminum in the laminated film; 31 is an outer resin covering the metallic foil 32; 33 is an interior resin covering the metallic foil 32; 34 is a connecting section with the terminal from the device main body circuit on the printed board 27; and 35 is a connecting section with the terminal from the device main body circuit on the printed board and the metallic foil 32 in the laminated film. Here, the device main body refers to an electronic apparatus, in particular, a mobile apparatus such as a notebook type personal computer or a mobile telephone. The plate-shaped battery 1 is attached to the housing (not shown) of the electronic device through the adhesive tape 28.

The laminated film comprises three layers of the outer resin 31, the metallic foil 32 and the inner resin 33, however it may be formed by an increased number of layers. Otherwise it may be formed by a combination of a bi-layer of the outer resin 31 and the metallic foil 32, or the inner resin 33 and the metallic foil 32.

In a constitution of the loaded orientation of the plate-shaped battery according to the embodiment 7, the electrical circuit using the metallic foil 32 in the laminated film as a part of the electrical circuit maintain a fixed distance with the metallic foil 32 of the laminated film. This is achieved by a disposition between the metallic foil 32 and the battery core 1a, or the plate-shaped battery 1 or the printed board 27 fixing these components or a combination of these. Thus, a condenser capacity is fixed and the plate-shaped battery 1 is fixed by a plate comprised of resin, metal, glass or the like. Furthermore, it is possible to fix the battery by pressuring the plate-shaped battery 1 with a back of the main body housing of the electronic apparatus.

In such a way, the respective condenser capacities are fixed to differing values generated by the fixed combination of the above constitutive components. Then, that condition may be served as a condenser component which has differing capacities, as exemplified in electrical circuits such as a protection circuit or the like.

The operation of the invention will be described below.

As discussed in the embodiment 6 above, in an aspect which uses an electrical circuit of the device main body, a reference potential of the battery is supplied to the electrical circuit by an electrical connection of the electrode 30 comprised by the cell electrode, with the terminal from the electrical circuit of the device main body through a connecting section 34. On the other hand, a condenser component of the electrical circuit such as a protection circuit is operated; by an electrical connection of the metallic foil 32 in the laminate and the terminal from the device main body through the connecting section 35.

As described above, according to the embodiment 7, the plate-shaped battery 1 is fixed by a plate made from resin, metal, glass or the like, and/or fixed and pressured by the back of the main body of the electronic apparatus. In a state where a condenser capacity is fixed with reference to the metallic foil 32 in the laminated film, the metallic foil 32 in the laminated film is led and electrically connected to an electrical circuit such as a protective circuit or the like. Thus, such a constitution may be served as a condenser component using the condenser capacity.

Embodiment 8

Figure 18:
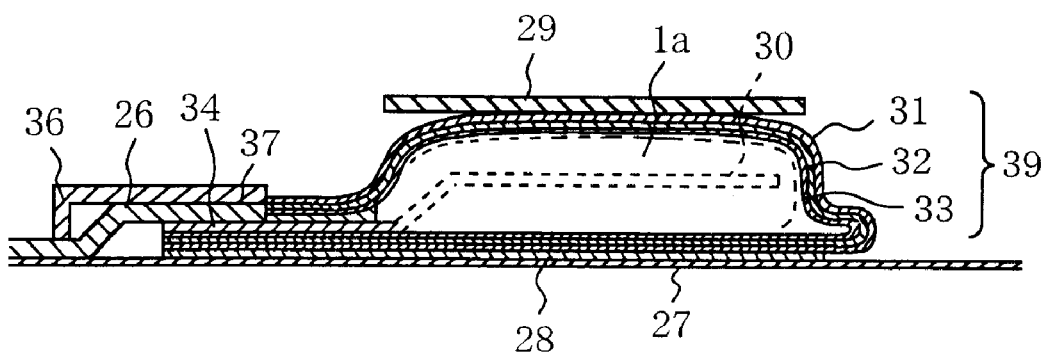
FIG. 18 is a longitudinal cross section showing a partial exploded view of a loaded structure of a plate-shaped battery according to an embodiment 8 of the present invention.

FIG. 18 is a longitudinal cross section showing a partial exploded view of a loaded structure of a plate-shaped battery according to an embodiment 8 of the present invention. In the figure, 36 denotes a terminal for an antenna from a circuit of a device main body of a radio device, an electronic apparatus or the like on a printed board 27. Other components are designated with the same numerals as in the embodiment 7 above and these further descriptions will be omitted.

A metallic foil in a laminated film for covering the battery such as aluminum with a high surface area and stored in a polymer resin such as polyethylene, polypropylene, polyethylene terephthalate, or the like which has a fixed dielectric constant is connected with a terminal 36 for the antenna of the device main body circuit through a connecting section 37. In such a way, an antenna for the main body device such as a radio is formed by a section of a metallic foil 32 in the laminated film and a condenser capacity with the standard potential of ground or the like of the device main body which is supplied by the plate-shaped battery 1 and a metallic foil 32 in the laminate film.

When the metallic foil 32 of the laminated film is used as an antenna, one variation is as follows: various polymer resins which comprise the laminated film which has a fixed dielectric constant may be used as capacity components of a matching circuit for matching the resistance of a high frequency circuit with a receiving surface area as an antenna.

The operation of the invention will be described below.

The laminated film containing the metallic foil 32 which is electrically connected by the terminal 36 for the antenna from the device main body circuit through the connecting section 37 is fixed to the plate-shaped battery 1 by a pressure with the plate 29 and functions as a condenser component having a fixed condenser capacity. On the other hand, the terminal 26 for connecting the electrode 30 is operated with the earth or the like of the device main body as an antenna by the plate-shaped battery 1 supplying a reference potential to the device main body.

As described above, according to the embodiment 8, a fixed condenser capacity is used about the metallic foil 32 in the laminated film which covers the plate-shaped battery 1. By using this as an antenna, it is possible to constitute a matching circuit by using the condenser capacity between the metallic foil 32 and the earth as a matching condenser in a matching circuit in the electronic circuit.

Embodiment 9

Figure 19:
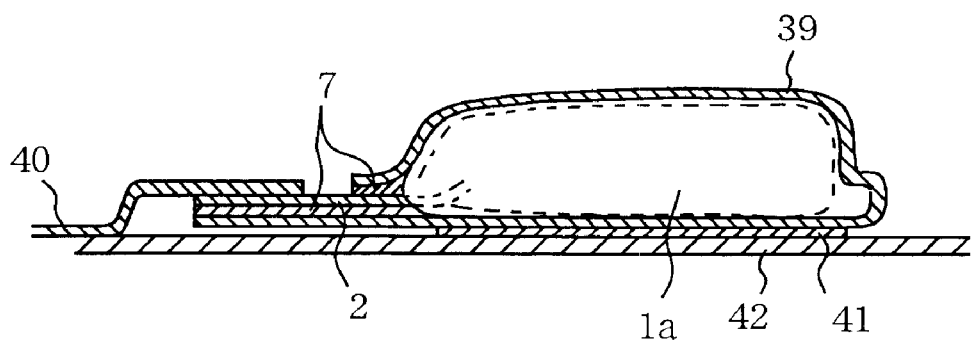
FIG. 19 is a longitudinal cross section showing a partial exploded view of a loaded structure of a plate-shaped battery according to an embodiment 9 of the present invention.

FIG. 19 is a longitudinal cross section showing a partial exploded view of a loaded structure of a plate-shaped battery according to an embodiment 9 of the present invention. In the figure, reference numeral 39 denotes an external sheet which is a laminated film of a plate-shaped battery 1; 40 is a battery wire; 41 is an adhesive tape; and 42 is a housing of a battery pack or the like for an electronic apparatus such as a radio or a personal computer. The external sheet 39 is formed from an outer resin 31, a metallic foil 32 and an inner resin 33. An adhesive material 7 adheres the external sheet 39 to an electrode 30 in the terminal section formed by the sealed laminate. The battery wire 40 electrically connects the electrode 30 through a connecting section.

In a constitution of the embodiment 9, the plate-shaped battery 1 is disposed in a predetermined fixed position in order to prevent battery movement. The position is determined to maintain a fixed distance between the earth of the printed board 27 or the power source line and the aluminum metallic foil 32 in the external sheet 39 in order to normally fix the condenser capacity during battery charging or discharge. Thus, the plate-shaped battery 1 is fixed to the housing 42 by the adhesive tape 41 such as a double sided tape or another adhesive and at the same time the plate-shaped battery is also fixed by soldering to the electrode 30.

As described above, according to the embodiment 9, irrespective of expansion or contraction of the battery due to charging or discharging, a condenser capacity may be normally fixed about the metallic foil 32 in the external sheet 39 by fixing the plate-shaped battery 1 to a fixed position which prevents movement.

Embodiment 10

Figure 20:
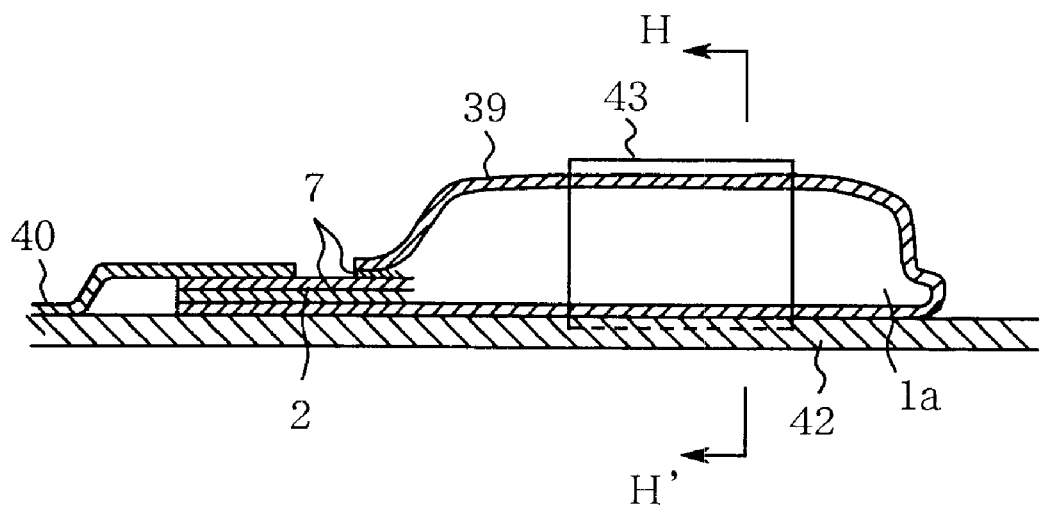
FIG. 20 is a longitudinal cross section showing a partial exploded view of a loaded structure of a plate-shaped battery according to an embodiment 10 of the present invention.
Figure 21:
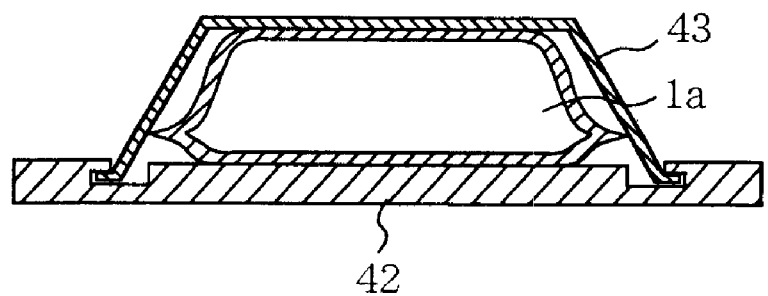
FIG. 21 is a cross sectional view along the line H–H' of FIG. 20.

FIG. 20 is a longitudinal cross section showing a partial exploded view of the loaded structure of a plate-shaped battery according to embodiment 10 of the present invention. FIG. 21 is a cross sectional view along the line H–H' of FIG. 20. In the figures, reference numeral 43 denotes a fit-in pressing component for sandwiching the plate-shaped battery 1.

A constitution of the embodiment 10 is directed to the same intent as in the embodiment 9, and a condenser capacity is stabilized and fixed about the metallic foil 32 in the external sheet 39, that is to say, the laminated film, by fixing the plate-shaped battery 1.

That is to say, the component 43 is formed by a pressing plate in an approximately rectangular shape which is bent at both ends. The cross sectional shape of the component is approximately in the shape of a squared letter "C" written backwards. The tip of the bent sections further bends outwardly and acts as an engaging projection with a housing 42. On the other hand, on a mounting side of the plate-shaped battery 1 on the housing 42, a groove is formed on the outer side along the lateral surface of a mounting position thereof.

The engaging projections at two positions which broaden toward a lower position on the pressing component 43 are engaged respectively with grooves which are pressed and bent inwardly to be conformed on the upper face of the housing 42. In such a way, it is possible to fix the plate-shaped battery 1 by pressing this with the back at the upper section of the pressing component 43. Thus, the flexibility of the pressing component 43 makes it possible to exchange the plate-shaped battery 1 and attach or detach the engaging section easily.

As shown above according to the embodiment 10, the plate-shaped battery 1 is adapted to be pressured and fixed by engaging the engaging projections of the pressuring component 43 with the groove or engaging indentations of the housing 42. Thus, in the same way as described above, irrespective of expansion or contraction of the battery due to charging or discharging, a condenser capacity may be normally fixed about the metallic foil 32 in the external sheet 39.

Embodiment 11

Figure 22:
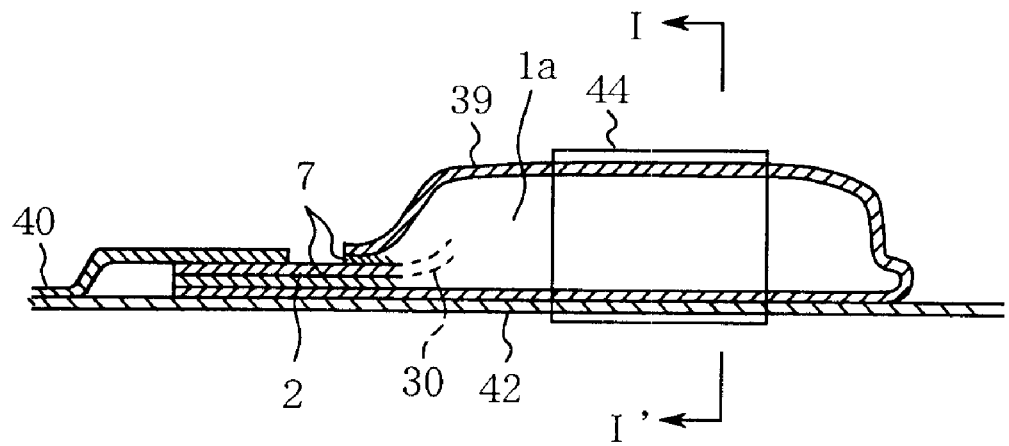
FIG. 22 is a longitudinal cross section showing a partial exploded view of a loaded structure of a plate-shaped battery according to an embodiment 11 of the present invention.
Figure 23:
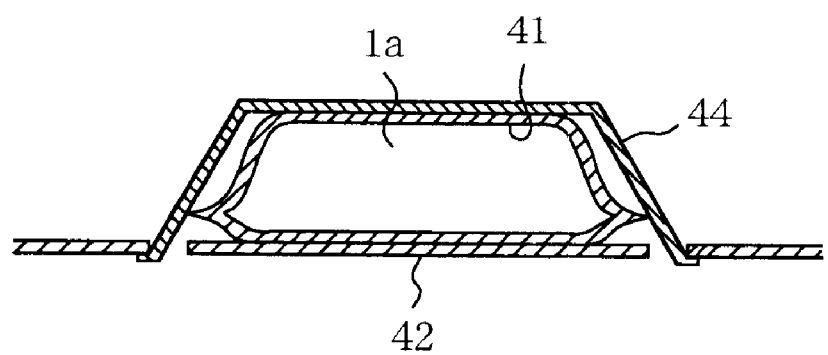
FIG. 23 is a cross sectional view along the line I–I' of FIG. 20.

FIG. 22 is a longitudinal cross section showing a partial exploded view of a loaded structure of a plate-shaped battery according to an embodiment 11 of the present invention. FIG. 23 is a cross sectional view along the line I–I' of FIG. 20. In the figures, reference numeral 44 denotes another pressing component for the plate-shaped battery 1.

Those components required for the embodiment 11 are shown in the figures and those components similar or the same to those as shown in embodiment 10 are denoted by the same reference numerals and further description will be omitted. The point of difference is that an engaging indentation of a housing 42 is not formed by a groove, but by a slit which pierces the housing. In such a way, engaging projections at two positions on the component 44 are engaged respectively with the slits, that is to say, with through-grooves. Thus, the engaging projections are fixed, while the plate-shaped battery 1 is pressed by a back at the upper section of the component 44.

As described above, according to the embodiment 11, the plate-shaped battery 1 is adapted to be pressured and fixed by engaging the engaging projections of the pressing component 44 with the slits of the housing 42. Thus, in the same way as described above, irrespective of expansion or contraction of the battery due to charging or discharging, a condenser capacity may be normally fixed about the metallic foil 32 in the external sheet 39.

Embodiment 12

Figure 24:
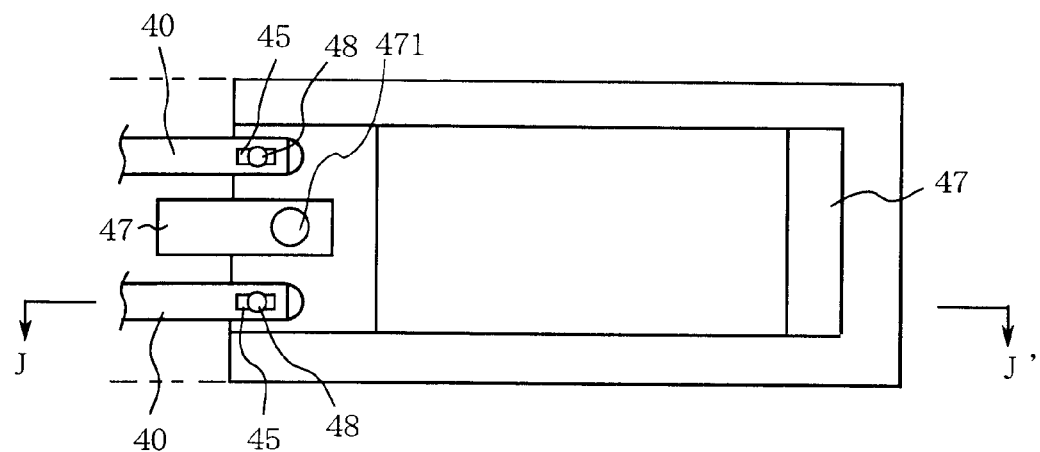
FIG. 24 is a top view showing a loaded structure of a plate-shaped battery according to an embodiment 12 of the present invention.
Figure 25:
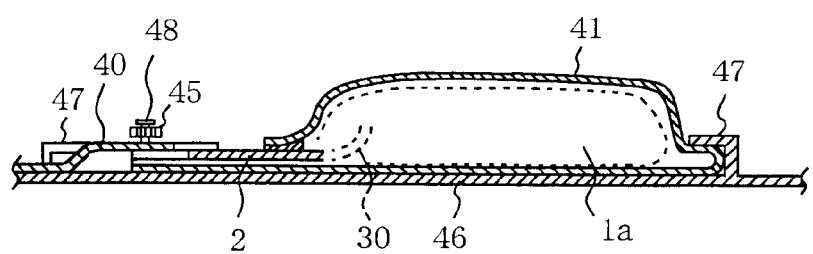
FIG. 25 is a cross sectional view along the line J–J' of FIG. 22.

FIG. 24 is a top view showing a loaded structure of a plate-shaped battery according to an embodiment 12 of the present invention. FIG. 25 is a cross sectional view along the line J–J'. In the figures, reference numeral 39 denotes an external sheet which forms a laminated film covering an aluminum metallic foil 32; 40 denotes a battery wire; 44 is another pressing component for the plate-shaped battery 1; 45 is a pressing member such as a connector or a pressing spring; 46 is a housing such as a battery pack for an electronic apparatus such as a personal computer or a radio provided with two hooks 47 for chucking; and 471 is a pressuring section.

The plate-shaped battery 1 is fixed to the housing 46 by fitting in the hooks 47 each of which is substantially in the shape of a letter "L" in cross section, and which are disposed opposite on the housing. Thereupon the battery is pressured by the pressing section 471. The electrode 30 which forms an outer terminal is pressed and fixed by the pressing member 45. The opposite lateral ends of the battery are inserted into the hooks 47 in turn by using plays of distance with the two hooks 47. The battery may be detachably fixed to the housing 46 and thus is easily inserted or detached.

In the embodiments 9–12 above, the plate-shaped battery 1 was described for the aspects as fixed to the housing 46. However, the battery 1 may also be fixed to a member fixed to the housing 46 such as a battery pack housing engaged with the housing 46, the electronic circuit fixing plate, or the printed board which is housed in the electronic apparatus.

As described above, according to the embodiment 12, the plate-shaped battery 1 is adapted to be held by the two hooks 47 for chucking which are formed in the housing 46 or the fixed board for the electronic components with using the plays of distance between the two hooks 47. Using the pressing component 44 such as a coil spring from the top of one of the hooked sections 47, the plate-shaped battery 1 is fixed. Thus, the attachment and detachment as well as the fixing of the plate-shaped battery 1 is facilitated and it is possible to perform accurate positional determination and fixation. Moreover, a contact resistance between the electrode 30 and the wiring 40 may be suppressed to an extremely low level.

Embodiment 13

Figure 26:
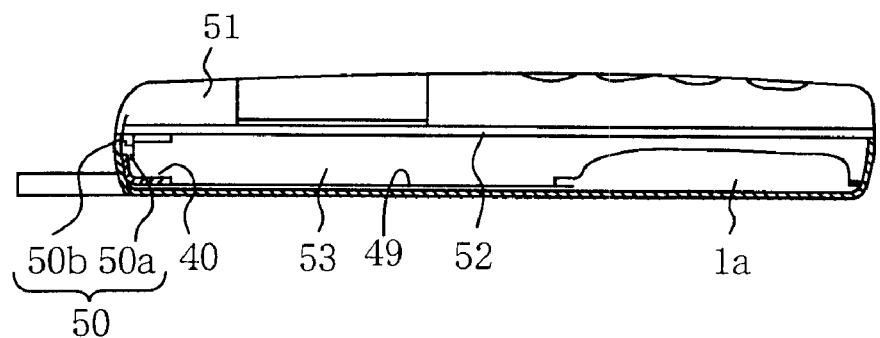
FIG. 26 is a longitudinal cross section showing a partial exploded view of a loaded structure of a plate-shaped battery according to an embodiment 13 of the present invention.

FIG. 26 is a longitudinal cross section showing a partial exploded view of a loaded structure of a plate-shaped battery according to an embodiment 13 of the present invention. In the figure, reference numeral 1 denotes a plate-shaped battery; 40 denotes battery wiring; 49 is a positive or negative electrode lead line extending from the plate-shaped battery 1; 50 is an electrical connecting section such as a connector; 51 is a main body housing of the electronic apparatus; 52 is a main base of the electronic apparatus; and 53 is a back of the housing. The electronic connecting component 50 is a connecting section with which the connector 50b on the main base 52 and the connector 50a on the back housing 53 are engaged.

In the embodiment 13, the plate-shaped battery 1 is described as mounted on the back housing 53 of the electronic apparatus. The housing of the electronic apparatus is formed by the main body housing 51 and the back housing 53. A display window, ten keys or the like are provided on the front surface of the main body housing, and an antenna is provided on the back of the housing 53. The main base 52 which contains the power source circuit is stored in the main housing 51 and the plate-shaped battery 1 is stored in the back housing 53.

In the plate-shaped battery 1, the electrode lead line 49 extends along the inner surface of the back housing 53, and reaches the proximity of the wall of the back housing 53. The outer electrode of the plate-shaped battery 1 is connected to the electrical connection component 50 through the battery wiring 40. The power source wiring connected to the power source circuit of the main base 52 is electrically connected to the connector 50b provided on the side of the main base 52. Thus, when the main housing 51 and the back housing 53 are engaged with each other, if the connectors 51a, 51b are engaged with each other, it is possible to create an electrical connection in the electrical connection component 50.

The operation of the invention will be described below.

Power supply from the plate-shaped battery 1 is possible through the connector 50a by engaging and electrically connecting the power source wiring, connected to the power source circuit of the main base 52, with the connector 50b and the connector 50a. Thus, other electrical circuits and the power source circuit in the main body of the electronic apparatus are activated and the device is normally operated.

As described above, according to the embodiment 13, a connector 50a is provided on the tip extending the cell electrode of the plate-shaped battery 1, and a connector 50b is provided on the electrical signal line containing the power source circuit of the electronic circuit of the main housing 51. When the connectors 50a, 50b are engaged with each other, an electrically connected connecting section is formed. Furthermore, a circuit which is electrically connected with the connector 50a is connected by adhesion with the back housing 53 in the main body of the electronic apparatus. Thus, it is possible to ensure connection of the plate-shaped battery 1 which has an electrode which is mechanically weak with an electrical circuit in the main body of the electronic apparatus.

Embodiment 14

Figure 27:
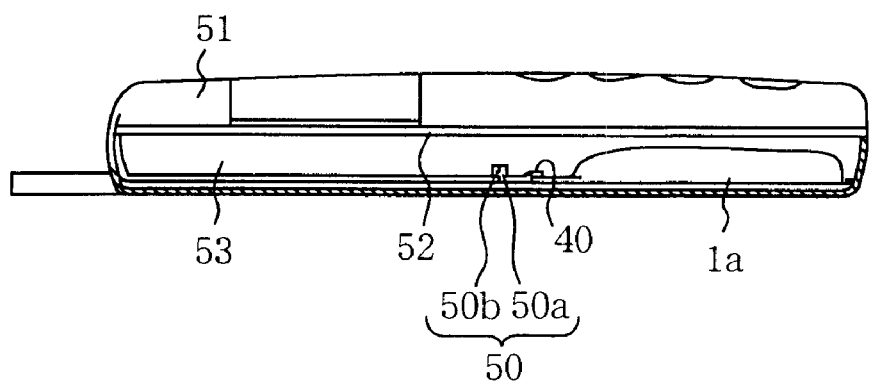
FIG. 27 is an explanatory view showing a partial exploded view of an electronic apparatus such as a mobile telephone according to an embodiment 14 of the present invention.

FIG. 27 is an explanatory view showing a partial exploded view of an electronic apparatus such as a mobile telephone according to an embodiment 14 of the present invention, and represents another embodiment of the electronic apparatus as discussed in the embodiment 13 above. The point of difference is that the connectors 50a, 50b are disposed in proximity to the periphery of the plate-shaped battery 1 in the back housing 53. That is to say, a power source wire is extended from the power source circuit along the inner surface of the back housing 53 and connected to the connector 50b disposed in proximity to the plate-shaped battery 1. On the other hand, the electrode lead line 49 of the plate-shaped battery 1 is formed short and the corresponding external electrode is electrically connected to the connector 50a.

As described above, according to the embodiment 14, a connecting section which is in electrical connection is formed by the engagement of a connector 50a provided on a tip extending a cell electrode of the plate-shaped battery 1 and a connector 50b provided on an electrical signal line containing a power source circuit of an electrical circuit of a main housing 51. Thus, a circuit which is electrically connected with the connector 50a is connected by adhesion with the back housing 53 of a main body of the electronic apparatus. Thus, in the same way as above, it is possible to ensure the connection of the plate-shaped battery 1 which has an electrode which is mechanically weak with the electrical circuit of the main body of the electronic apparatus.

Embodiment 15

Figure 28:
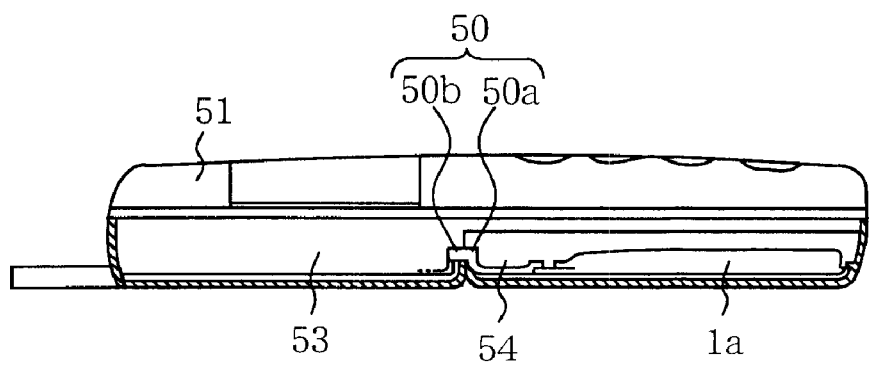
FIG. 28 is an explanatory view showing a partial exploded view of an electronic apparatus such as a mobile telephone according to an embodiment 15 of the present invention.

FIG. 28 is an explanatory view showing a partial exploded view of an electronic apparatus such as a mobile telephone according to an embodiment 15 of the present invention. In the figure, reference numeral 53 denotes a back housing; and 54 is a battery housing and back housing. The housing of the electronic apparatus is comprised of the main housing 51, the back housing 53, and the.back housing and battery housing 54.

The embodiment 15 is related to the embodiments 13 and 14 above, and shows a plate-shaped battery 1 mounted on the back housing and the battery housing 54 of the electronic apparatus. The back housing and the battery housing 54 is detachably. engaged with the back housing 53 and the main housing 51 and a housing is formed on the side of the back of the electronic apparatus together with the back housing 53.

The plate-shaped battery 1 is stored in the back housing and the battery housing 54 and an outer terminal of the plate-shaped battery 1 is electrically connected with a connector 50a provided on a tip of the back housing and battery housing 54 through a power source wiring. Another power source wiring connected with a power source circuit on a main base 52 is disposed along the inner surface of the back housing 83 and electrically connected with a connector 50b provided on the tip of the back housing 53. Thus, when the back housing and the battery housing 54 incorporating the plate-shaped battery 1 is mounted on the electronic apparatus, if the connectors 50a, 50b are engaged and electrically connected, the cell electrode and an electrical circuit containing a power source wiring of a main apparatus will be electrically connected with each other.

The operation of the present embodiment is the same as that of the embodiment 13 and further description will be omitted.

As described above, according to the embodiment 15, a connecting section such as the connector 50a on electrical wiring areas of the plate shaped battery 1 or a connector is mounted on an electrical signal wiring which contains a power source circuit of an electronic circuitry in a main body of an electronic apparatus. A circuit which is electrically connected with the connector 50a is connected by adhesion with the back housing 53 of the main body of the apparatus. Therefore, in the same way as above, it is possible to ensure an electrical connection of the plate-shaped battery 1 which has an electrode which is mechanically weak with the electrical circuit of the main body of the electronic apparatus.

Embodiment 16

Figure 29:
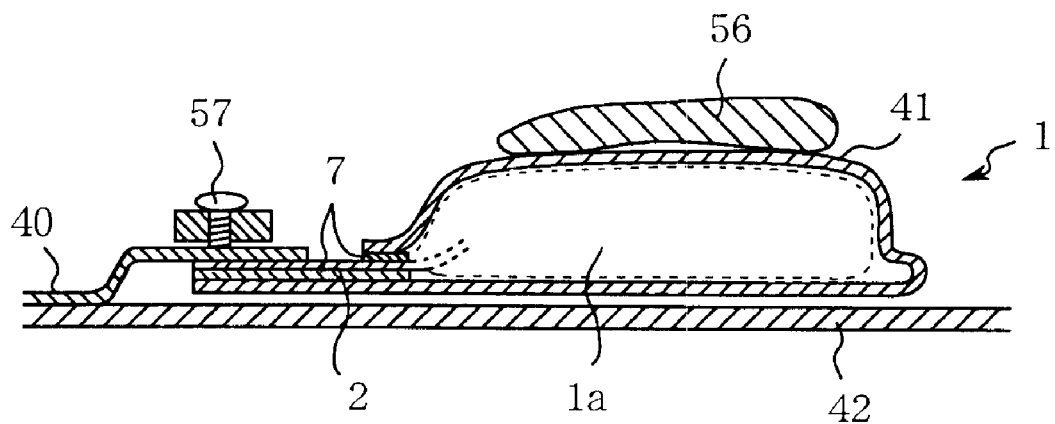
FIG. 29 is a cross sectional view of a plate-shaped battery according to an embodiment 16 of the present invention.

FIG. 29 is a cross sectional view of a plate-shaped battery according to an embodiment 16 of the present invention. In the figure, reference numeral 40 denotes a battery wiring; 42 is a battery housing of an electronic apparatus; 56 is a battery fixing clip; and 57 is a fixing means such as a connector or a pressing spring.

According to the embodiment 16, a battery housing 54 (FIG. 28) and an electrode of a plate-shaped battery 1 are fixed onto a main base 52 or a main body housing 51 of the electronic apparatus or the like using a fixing means 57. In such a way, it is possible to electrically connect a cell electrode of the plate-shaped battery 1 and an electric circuit of an apparatus main body. The battery wiring 40 may also be connected with the electric circuit of the apparatus main body by using a connecting section which uses the connectors 50a, 50b above.

As described above, according to the embodiment 16, the fixing means such as a pressing spring, a fixing clip or the like is adapted to the connecting section and thus an accurate positional determination and a fixation of the electrode and the battery may be possible. In addition, a contact resistance between the electrode and the wiring may be suppressed to an extremely low level.

Embodiment 17

Figure 1:
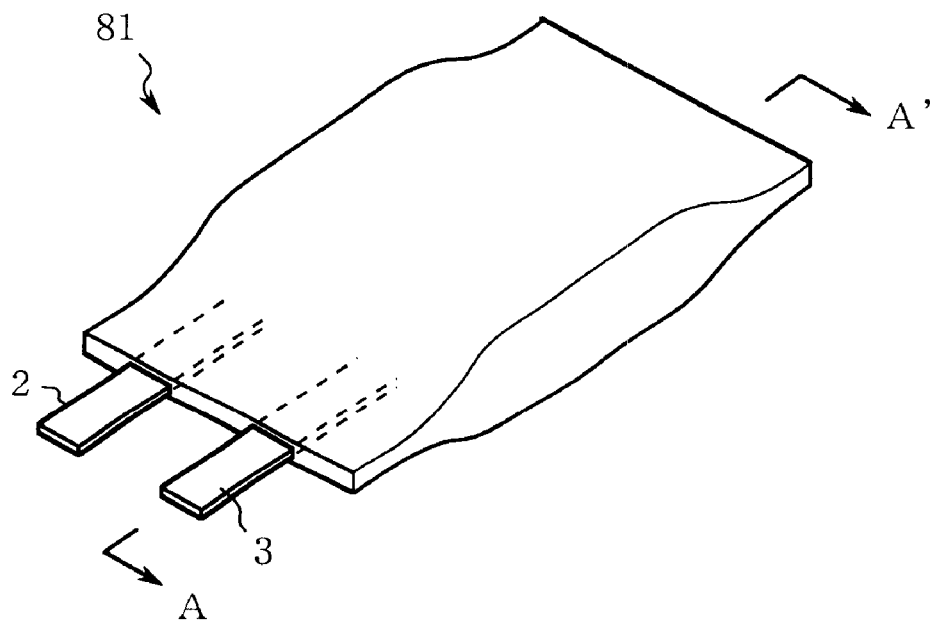
FIG. 1 is a perspective view of a conventional thin plate-shaped battery.
Figure 2:
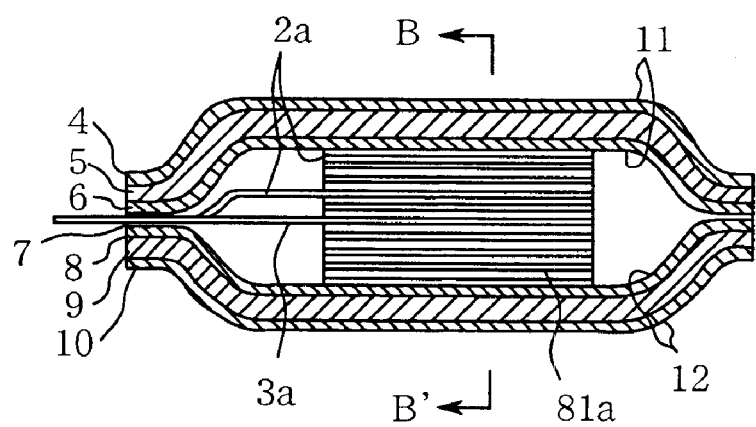
FIG. 2 is a cross sectional view along the line A–A' of FIG. 1.
Figure 30:
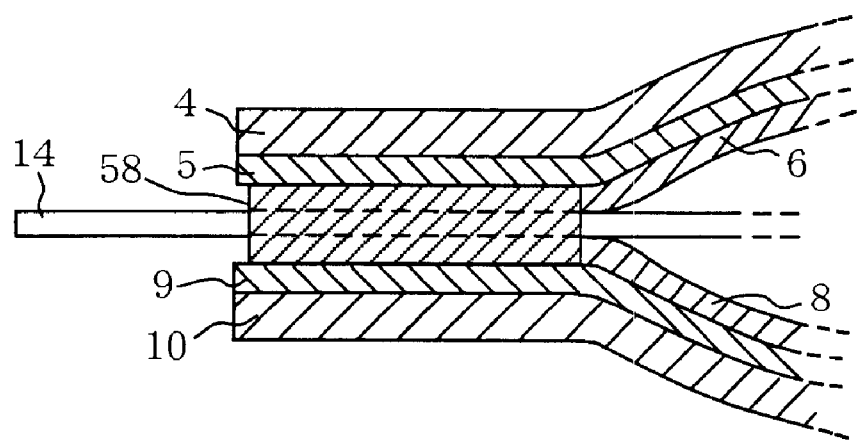
FIG. 30 is a cross sectional view of an electrical lead line of a plate-shaped battery according to an embodiment 17 of the present invention.

FIG. 30 is a cross sectional view of an electrical lead line of a plate-shaped battery according to an embodiment 17 of the present invention and corresponds to a cross section along a line A–A' in FIG. 1.

In the figures, reference numerals 5, 9 each denote a metallic foil which is formed from a metallic material such as aluminum; 4, 6, 8, 10 each denote a polymer resin such as such as polyethylene, polypropylene, polyethylene terephthalate, and is a resin covering the metallic foils 5, 9; 14 is an electrode lead line; and 58 is a resin to which the inner resins 6, 8 of the laminated film are thermally adhered.

According to the embodiment 17, in the conventional plate-shaped battery 81, when the battery core 81*a* was wrapped with a laminated film comprised of three or more layers interposing the metallic foils 5, 9 of aluminum or the like with the polymer resins 4, 6, 8, 10 such as polyethylene, polypropylene, polyethylene terephthalate, a different resin A from the polymer resins 4, 6, 8, 10 had been applied to be wrapped as an adhesive material with the laminated film. However, the present embodiment performs sealing by heat fusion of the resins 6, 8 on the battery cell each of which has both qualities of the resin A used for adhesion and the conventional laminated film resin. This is achieved by polymerization of two types of polymers in heat fusion the innermost layer of the laminated film without use of the resin A.

As described above, according to the embodiment 17, the resin 58 for adhesion is provided by heat fusion of the resins 6, 8 on the side of a battery core 1*a*. This resin is cooled and fixed between the electrode lead line 14 and the laminated film. Thus, it is possible to simplify the structure by the omission of the previously required resin A and to provide a plate-shaped battery in which a laminated sealing is simplified.

Embodiment 18

Figure 31:
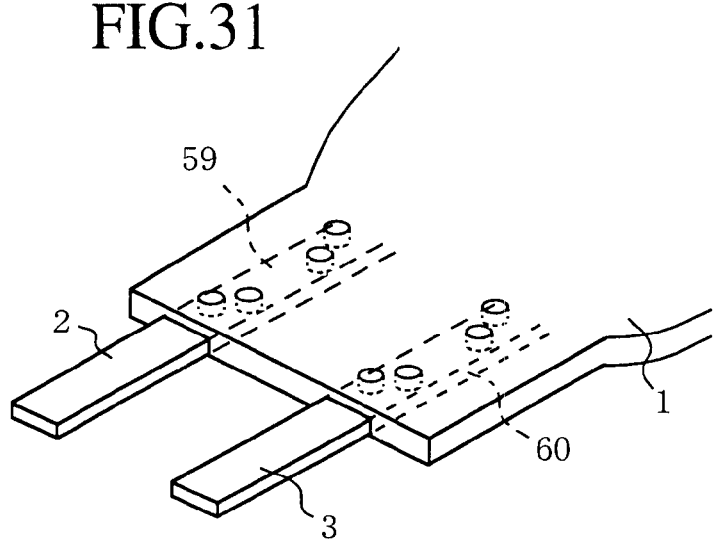
FIG. 31 is a partial perspective view of an electrode lead line section of a plate-shaped battery according to an embodiment 18 of the present invention.

FIG. 31 is a partial perspective view of an electrode lead line section of a plate-shaped battery according to an embodiment 18 of the present invention. In the figure, reference numerals 2, 3 each are positive and negative electrode lead lines from an internal battery; 59 is an aperture on the side of the positive electrode lead line of the battery which opens a hole in a sealed section; and 60 is an aperture on the side of the negative electrode lead line of the battery which opens a hole in the sealed section.

In the embodiment 18, the apertures 59, 60 are adapted to the laminate sealed portions of the electrode lead lines 2, 3. This is achieved by opening a large number of holes with a punch or the like or by use of a plate originally provided with holes with respect to the electrode lead lines 2, 3. In such a way, for example, inner resins 6, 8 on the side of the internal battery are thermally melted as in the embodiment 17, and this resin is adhered by pouring through the numerous holes in the apertures 59, 60. Thus, when the resin in the apertures 59, 60 acts as a wedge, the laminated film and the electrode lead lines 2, 3 are strongly adhered to each other.

As described above, according to the embodiment 18, the resin 58 is used for adhering by heat fusion of the resins 6, 8 on the side of the battery core 1*a*. This fused resin 58 is formed between the laminated film of the electrode lead lines 2, 3 portions, and cools and hardens after passing through the apertures 59, 60. In addition to obtaining the aforementioned simple structure and laminated seal, since the apertures 59, 60 are adhered as if by a wedge, the adhesion of the electrode lead lines 2, 3 and the laminated film is improved and it is possible to improve the strength of the device with respect to lead line detachments.

Embodiment 19

Figure 32:
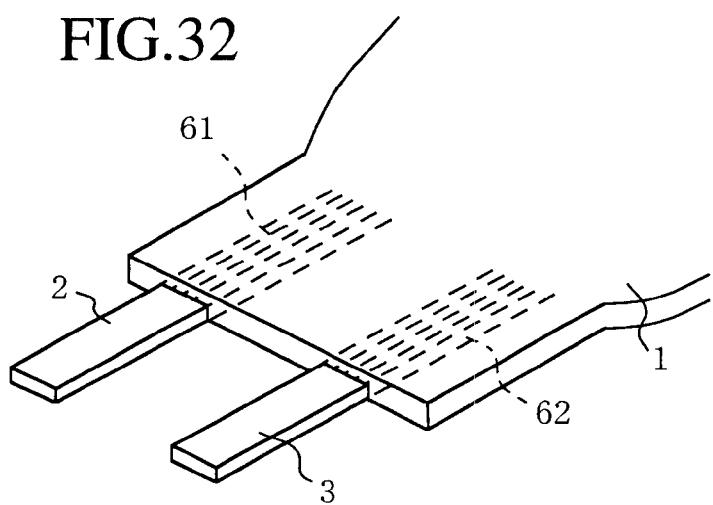
FIG. 32 is a partial perspective view of an electrode lead line section of a plate-shaped battery according to an embodiment 19 of the present invention.

FIG. 32 is a partial perspective view of an electrode lead line section of a plate-shaped battery according to an embodiment 19 of the present invention. In the figure, reference numeral 61 is a roughened surface on the side of a positive electrode lead line of the battery which roughens the surface of a sealed section; and 62 is a roughened surface on the side of a negative electrode lead line of the battery which roughens the surface of the sealed section.

The structure in the embodiment 19 is characterized by the provision of the roughened surfaces 61, 62 instead of the aperture 59, 69 as described in the embodiment 18. Thus, when the electrode lead lines 2, 3 are adhered by heat, the contact surface of the electrode lead lines 2, 3 with an aluminum laminated film through a resin is increased by the mated structure (respectively indented and protruding) of the roughened surfaces 61, 62. Thus, the electrode lead lines 2, 3 and the aluminum laminated film are more strongly adhered to each other.

As described above, according to the embodiment 19, a resin 58 is used for adhering by heat fusion of resins 6, 8 on the side of the battery core 1*a*. This resin 58 is formed between the laminated film of the electrode lead lines 2, 3 portions and cools and hardens after passing through the roughened surfaces 61, 62. In addition to obtaining the aforementioned simple structure and laminated seal, since the roughened surfaces 61, 62 have a mated structure, the contact surface of the electrode lead lines 2, 3 with the aluminum laminated film through the resin 58 is increased and thus adhesion is improved. Thus, it is possible to improve the strength of the device with respect to lead line detachments.

Embodiment 20

Figure 33:
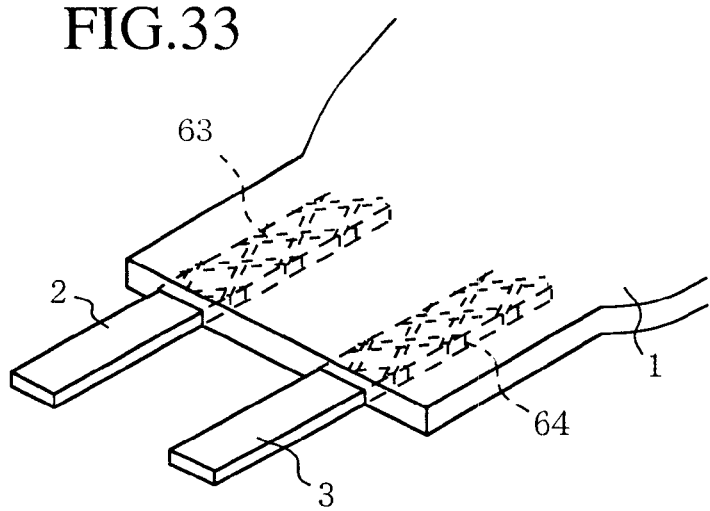
FIG. 33 is a partial perspective view of an electrode lead line section of a plate-shaped battery according to an embodiment 20 of the present invention.

FIG. 33 is a partial perspective view of an electrode lead line section of a plate-shaped battery according to an embodiment 20 of the present invention. In the figure, reference numeral 63 denotes a flat mesh on the side of the positive electrode lead line of a battery provided with a roughened surface in the sealed section; and 64 denotes a flat mesh on the side of the negative electrode lead line of a battery provided with a roughened surface in the sealed section.

The structure in the embodiment 20 is similar to that as described in the embodiment 19 and is characterized by the provision of the flat meshes 63, 64 instead of the roughened surfaces 61, 62. Thus, when the electrode lead lines 2, 3 are adhered by heat fusion, the contact surface of the electrode lead lines 2, 3 with the aluminum laminated film through the resin is increased due to a roughness configuration or mated structure of the flat mesh 63, 64. Thus, the electrode lead line 2, 3 and the aluminum laminated film are more strongly adhered to each other.

As described above according to the embodiment 20, a resin 58 is used for adhering by heat fusion of the resins 6, 8 on the side of the battery core 1*a*. This resin 58 is formed between the laminated film of the electrode lead lines 2, 3 portions and cools and hardens after passing through the flat meshes 63, 64. In addition to obtaining the aforementioned simple structure and laminated seal, since the flat meshes 63, 64 have the mated structure, an adhesion is improved since the electrode lead lines 2, 3 and the laminated film are adhered by the resin 58 which has an increased contact area. Thus, it is possible to improve the strength of the device with respect to lead line detachments.

Embodiment 21

Figure 34:
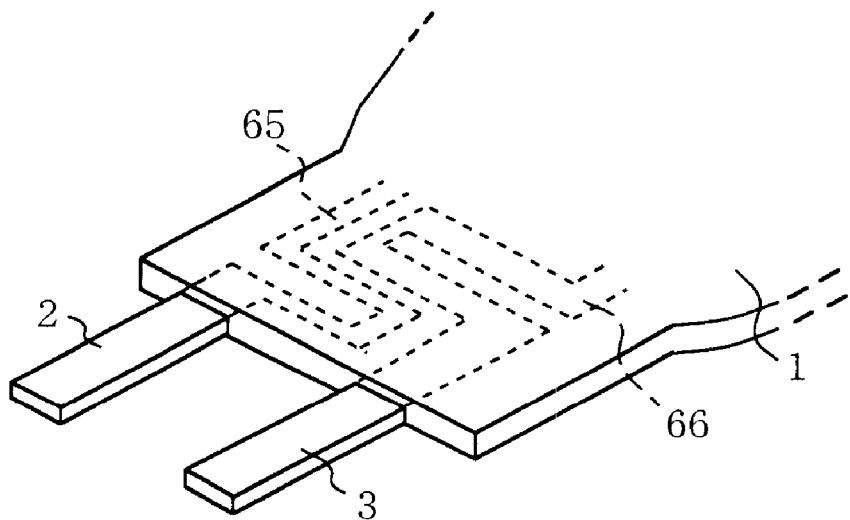
FIG. 34 is a partial perspective view of an electrode lead line section of a plate-shaped battery according to an embodiment 21 of the present invention.

FIG. 34 is a partial perspective view of an electrode lead line section of a plate-shaped battery according to an embodiment 21 of the present invention. In the figure, reference numeral 65 is a zigzag section on the side of the positive electrode lead line of the battery adapting the sealed section into a zigzag shape; and 66 is a zigzag section on the side of a negative electrode lead line of the battery adapting the sealed section into a zigzag shape.

According to a feature of the embodiment 21, the terminal section sealed by the laminate of the electrode lead lines 2, 3 is adapted to take the shape of a zigzag. Thus, when the electrode lead lines 2, 3 are adhered by heat fusion, the contact surface of the electrode lead lines 2, 3 and the aluminum laminated film through the resin is increased by the zigzag pattern of the zigzag sections 65, 66 and thus the adhesion of the electrode lead lines 2, 3 and the aluminum laminated film is strengthened.

Furthermore, the creeping distance of the electrode lead lines 2, 3 and the battery core 1a is lengthened and leaks such as gas generated from the electrolytic fluid of the battery or the like are reduced.

As described above, according to the embodiment 21, a resin 58 is used for adhering by heat fusion of the resins 6, 8 on the side of the battery core 1a. This resin 58 is formed between the laminated film of the electrode lead lines 2, 3 portions and cools and hardens after passing through the zigzag sections 65, 66. In addition to obtaining the aforementioned simple structure and laminated seal, since the zigzag sections 65, 66 have a zigzag structure, adhesion is improved as the electrode lead lines 2, 3 and the laminated film are adhered by the resin 58 which has an increased contact area. Thus, it is possible to improve the strength of the device with respect to lead line detachments.

Furthermore, since the creeping distance of the electrode lead lines 2, 3 of the battery core 1a is lengthened due to the zigzag pattern of the electrode lead lines 2, 3 of the terminal, leaks such as a gas generated from an electrolytic fluid of the battery or the like are reduced.

Embodiment 22

Figure 35:
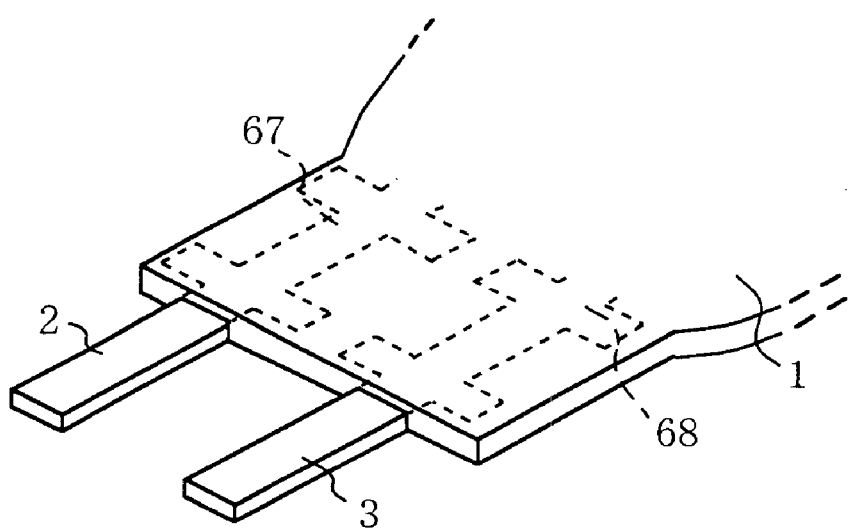
FIG. 35 is a partial perspective view of an electrode lead line section of a plate-shaped battery according to an embodiment 22 of the present invention.

FIG. 35 is a partial perspective view of an electrode lead line section of a plate-shaped battery according to an embodiment 22 of the present invention. In the figure, reference numeral 67 is a branched section on the side of a positive electrode lead line of the battery which forms the sealed section in a branching shape; and 68 is a branched section on the side of a negative electrode lead line of the battery which forms the sealed section in a branching shape.

A feature in the embodiment 22 is similar to that as described in the embodiment 21 and is characterized by the provision of the branched sections 67, 68 instead of the zigzag sections 65, 66. Thus, in the same way as above, when the electrode lead lines 2, 3 is adhered by heat fusion, a contact surface of the electrode lead lines 2, 3 with the aluminum laminated film through the resin is increased by branched patterns of the branched sections 67, 68. Thus, the electrode lead lines 2, 3 and the aluminum laminated film are more strongly adhered to each other.

As described above according to the embodiment 19, the resin 58 is used for adhering by heat fusion of the resins 6, 8 on the side of the battery core 1a. This resin 58 is formed in the laminated film on the electrode lead lines 2, 3, and cools and hardens after passing through the branched sections 67, 68. In addition to obtaining the aforementioned simple structure and laminated seal, since the branched sections 67, 68 have a branched structure, an adhesion is improved as the electrode lead lines 2, 3 and the laminated film are adhered by the resin 58 which has an increased contact area. Thus, it is possible to improve the strength of the device with respect to lead line detachments.

Embodiment 23

Figure 36:
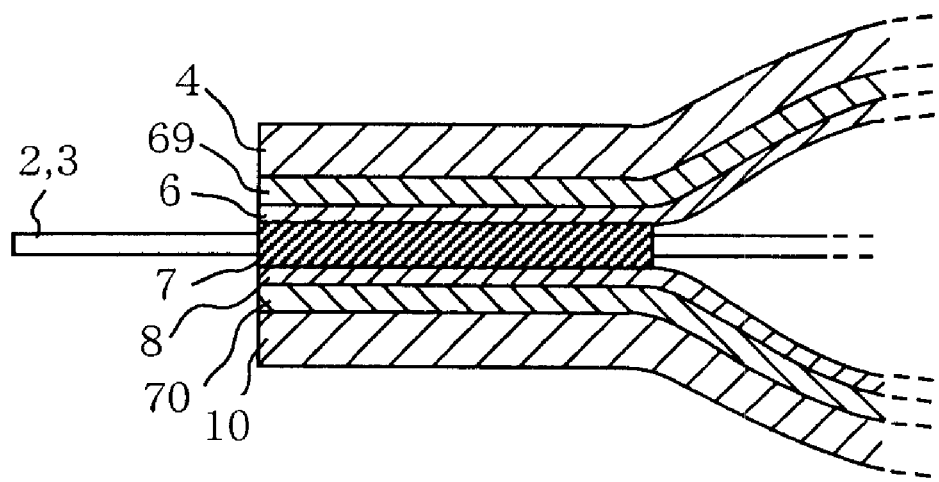
FIG. 36 is a cross sectional view of an electrode lead line section of a plate-shaped battery according to an embodiment 23 of the present invention.

FIG. 36 is a cross sectional view of an electrode lead line section of a plate-shaped battery according to an embodiment 23 of the present invention and corresponds to a section of the cross section along the line A–A' in FIG. 1.

In the figures, reference numerals 69, 70 each denote a metallic foil which is formed from a metallic material such as stainless steel; 4, 6, 8, 10 each are a resin which covers the metallic foils 69, 70 and which is comprised of a polymer resin such as polyethylene, polypropylene, or polyethylene terephthalate; 2, 3 each denote respective positive and negative lead lines; and 7 denotes a resin which adheres the resins 6, 8 and the electrode lead lines 2, 3.

According to the embodiment 23, the metallic foil 69, 70 in the laminated film is comprised of metal such as stainless steel or the like which can be extended thinly, which is mechanically strong and which has few pinholes. In this way, it is possible to prevent damage due to shocks from the exterior of the device from reaching the internal battery to a greater extent than was possible with the conventional aluminum metallic foils 5, 9. Moreover, stainless steel is corrosion resistant and it is possible to reduce the weight of the battery since the foil is extended thinly.

In this way, according to the embodiment 23, since the metallic foils 69, 70 in the laminated film is comprised of metal such as stainless steel or the like which can be extended thinly, which is mechanically strong and which has few pinholes, the advantages of protection from external shocks, corrosion resistance and reductions in battery weight due to thin extension of the foil are possible.

Embodiment 24

Figure 37:
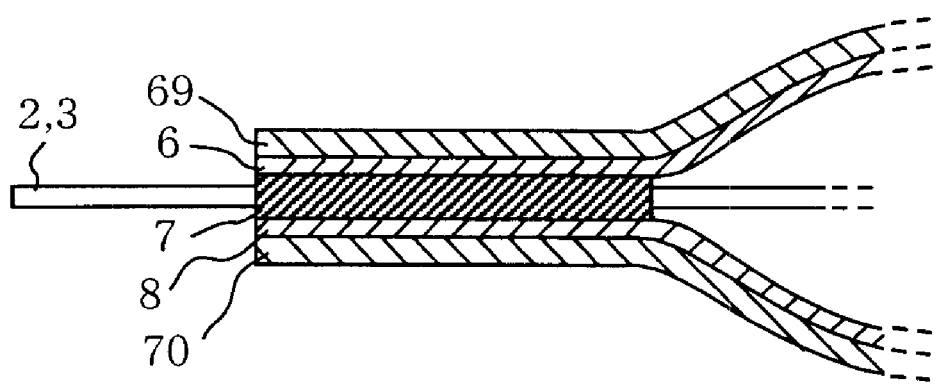
FIG. 37 is a cross sectional view of an electrode lead line section of a plate-shaped battery according to an embodiment 24 of the present invention.

FIG. 37 is a cross sectional view of an electrode lead line section of a plate-shaped battery according to an embodiment 24 of the present invention and corresponds to a section of the cross section along the line A–A' in FIG. 1.

Embodiment 24 is similar to the aforementioned embodiment 23, however, is characterized in that the resins 4, 10 for preventing external shocks is omitted in order to simplify the structure of the device. Thus, in this way, the structure may be simplified.

The description with respect to the embodiments 17–24 described a plate-shaped battery 1 as described in the embodiments 1–16. However, needless to say, it is possible to use the conventional plate-shaped battery 81 in the same way.

Industrial Application

As described above, an electronic device and a plate-shaped battery according to the present invention uses a metallic foil in a laminated film and a polymer resin such as polyethylene, polypropylene, polyethylene terephthalate, having a dielectric constant as an electronic component such as an antenna which is adapted for use in a mobile phone, radio, a personal computer or the like.

What is claimed is:

1. A plate-shaped battery comprising:
    a laminate battery core formed of a sheet-shaped positive electrode and a sheet-shaped negative electrode having a separator therebetween, said battery core having a positive terminal and a negative terminal electrically connected to said positive electrode and said negative electrode, respectively; and
    a laminated film comprising a laminate of a polymer resin and a metallic foil, said laminated film covering said battery core and sealing said positive electrode and said negative electrode terminals,
    wherein said metallic foil is electrically connected with one of said electrodes.

2. A plate-shaped battery according to claim 1, further comprising first and second apertures formed in a terminal section of said laminated film which seals said positive and negative terminals, said first and second apertures respectively exposing both said terminals, said metallic foil connected electrically with one of said electrodes through one of said apertures.

3. A plate-shaped battery according to claim 1, further comprising a wire connector led from one of said positive and negative electrodes to said metallic foil in order to create a fixed potential in said metallic foil of said laminated film.

4. A plate-shaped battery according to claim 3, wherein a hole is opened in a section of a battery housing and said connector electrode is led through this aperture section.

5. A plate-shaped battery according to claim 1, wherein in said metallic foil of said laminated film, either said positive terminal or said negative terminal and a positive or negative terminal outside a housing of said battery are positioned with respect to a lead line of said metallic foil in the same section or in different sections when observed from a predetermined side of said battery.

6. A plate-shaped battery according to claim 1, further comprising a shield which functions as at least one of an electrical shield, a magnetic shield or an electrostatic shield which shields an electrical circuit coupled to said battery which supplies an electrical energy of said battery, and said battery core which is stored in said laminated film, said shield being comprised by electrically connecting said metallic foil in said laminated film to said negative or positive terminal.

7. A plate-shaped battery according to claim 1, further comprising a metallic terminal which is electrically connected with said metallic foil in said laminated film and which is led from a section of said battery housing which is separate from said positive and negative electrodes.

8. A plate-shaped battery according to claim 2, further comprising an island created by a metallic foil comprising a laminated film, and disposed proximate said terminal section.

9. A plate-shaped battery according to claim 8, further comprising an electrical circuit constituted by mounting one or more than one electrical component on said island of said terminal section.

10. A plate-shaped battery according to claim 9, wherein a section of said electrical circuit is connected with one of said metallic foil of said laminated film, said positive terminal or said negative terminal.

11. A plate-shaped battery according to claim 10, further comprising a printed circuit board disposed by mounting an electrical circuit between a negative or positive terminal and a metallic terminal which is connected electrically with said metal foil of said laminated film, said printed circuit board being fixed onto said terminal section.

12. An electronic apparatus comprising:
    (a) a plate-shaped battery including: a laminate battery core formed of a sheet-shaped positive electrode and a sheet-shaped negative electrode having a separator therebetween, said battery core having a positive terminal and a negative terminal electrically connected to said positive electrode and said negative electrode, respectively; and a laminated film having a laminate of a polymer resin and a metallic foil, and covering said battery core and sealing said positive and negative terminals, said metallic foil electrically connecting with an external end of one of said electrodes; and
    (b) an electrical circuit which mounts at least one electrical component on an island created by said metallic foil formed proximate the part of said laminated film sealing said positive and negative terminals, said plate-shaped battery and the electrical circuit being contained by a main housing and a back housing,
        wherein said plate-shaped battery is fixed in place with a plate which is comprised by a material composed of at least one of glass, metal and resin, said plate fixing said plate-shaped battery by maintaining a fixed distance from said metallic foil and setting a capacitance by being disposed between said metallic foil and at least one of said battery core, said plate-shaped battery, a housing mounting said battery core, said plate-shaped battery, or said plate fixing said plate-shaped battery.

13. An electronic apparatus according to claim 12, wherein said plate-shaped battery is fixed by pressing said battery with a back of said main housing.

14. An electronic apparatus according to claim 12, further comprising an antenna created by a capacitance between a reference potential supplied by the plate-shaped battery and the metallic foil in the laminated film, and at least a section of said metallic foil.

15. An electronic apparatus according to claim 12, wherein said plate-shaped battery is fixed to a predetermined position in order to be positioned at a fixed distance from said metallic foil in said laminated film and ground or a power source line on said printed board.

16. An electronic apparatus according to claim 12, wherein a first connector is mounted on an extended tip section of electrical wiring which is connected to a cell electrode of said battery, said extended tip section extending said cell electrode of said plate-shaped battery mounted on said back housing, and
    wherein a connecting device containing a second connector is mounted on an electrical signal line containing a power source circuit of an electronic circuit in said main housing, and a circuit electrically connected with said first connector is adhered and connected to said back housing.

17. An electronic apparatus according to claim 12, wherein said plate-shaped battery is fixed in place by sandwiching a battery housing, which is a section of said back housing, and a cell electrode of said plate-shaped battery with a fixing means onto a printed circuit board or housing of another electronic apparatus.

18. A plate-shaped battery according to claim 1, wherein a terminal sealing positive and negative terminals is formed by heat fusion of a polymer resin on a side of said battery without the use of a different resin than said polymer resin, said resin acting as an adhesive with said laminated film when said battery core is covered with said laminated film which has a laminated structure sandwiching a metallic foil with said polymer resin.

19. A plate-shaped battery according to claim 1, wherein in a terminal sealed with a laminate film of positive and negative electrode lead lines which are respectively electrically connected to the positive and negative terminals, said positive and negative electrode lead lines are formed with one of an elongated flat net structure, a hole opened in said lead lines, a roughened structure, or in a branched or zigzag pattern.

20. A plate-shaped battery according to claim 1, wherein said laminate film comprises a laminated structure of a metallic foil formed from stainless steel, iron, copper or nickel and a polymer resin, said polymer resin being disposed on the side of said battery cell.

* * * * *